United States Patent
Yamasaki et al.

(10) Patent No.: US 7,154,535 B2
(45) Date of Patent: Dec. 26, 2006

(54) DIGITAL CAMERA CAPABLE OF DIRECTLY ACCESSING IMAGES RECORDED ON ANOTHER DIGITAL CAMERA

(75) Inventors: Fumitomo Yamasaki, Nara (JP); Hideki Aikoh, Osaka (JP); Tohru Nakamura, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 994 days.

(21) Appl. No.: 10/194,824

(22) Filed: Jul. 12, 2002

(65) Prior Publication Data

US 2003/0011683 A1   Jan. 16, 2003

(30) Foreign Application Priority Data

Jul. 13, 2001 (JP) .............................. 2001-213380

(51) Int. Cl.
H04N 5/232 (2006.01)

(52) U.S. Cl. .................... 348/207.1; 348/211.1

(58) Field of Classification Search .. 348/207.1–207.2, 348/211.99, 211.2, 211.12, 231.99, 231.2, 348/231.3, 231.6, 231.9
See application file for complete search history.

(56) References Cited

U.S. PATENT DOCUMENTS 6,188,431 B1 * 2/2001 Oie .......................... 348/211.5
6,522,354 B1 * 2/2003 Kawamura et al. ...... 348/231.2
6,741,271 B1 * 5/2004 McConica et al. ........... 715/839
6,774,935 B1 * 8/2004 Morimoto et al. ........ 348/211.5
6,864,911 B1 * 3/2005 Zhang et al. .................. 348/42
2006/0087568 A1 * 4/2006 Tanaka et al. .......... 348/231.99

FOREIGN PATENT DOCUMENTS

| JP | 11-355705 | 12/1999 |
|----|-----------|---------|
| JP | 2000-350134 | 12/2000 |

* cited by examiner

Primary Examiner—Vivek Srivastava
Assistant Examiner—Timothy J. Henn
(74) Attorney, Agent, or Firm—Snell & Wilmer LLP

(57) ABSTRACT

A digital camera includes: an image capturing section; an image data generation section; a display section; a recording/reproducing section; a data communication section; and a control section. The image data generation section generates image data, which represents the image of the object that is captured by the image capturing section, and index data associated with the image data. The display section displays the image data and the index data. The recording/reproducing section records the image data and the index data in a memory section and reproduces the image data and the index data recorded in the memory section. The data communication section sends the image data and the index data, which are recorded in the memory section, to an external device, and receives image data and index data from the external device. The control section controls the image data generation section, the recording/reproducing section, and the data communication section.

21 Claims, 22 Drawing Sheets

PRIOR ART

DIGITAL CAMERA CAPABLE OF DIRECTLY ACCESSING IMAGES RECORDED ON ANOTHER DIGITAL CAMERA

BACKGROUND OF THE INVENTION

1. Field of the Invention

The present invention relates to a digital camera where image data is recorded in an information recording medium. More specifically, the present invention relates to a digital camera which can make a copy of, or move, desired image data selected from image data recorded in another digital camera without using a personal computer or the like.

2. Description of the Related Art

A digital camera converts light reflected by an object to an electrical signal so as to generate image data, and records the generated image data in an information recording medium such as a semiconductor memory, an optical disc, a floppy disc, or the like; and reproduces and displays an image on a display based on such recorded image data. The image may be a still image or a moving image.

FIG. 25 shows a structure of a conventional digital camera 2500.

The digital camera 2500 includes an image capturing section 2501, an image processing section 2502, a monitor 2503, a memory control section 2504, and an information recording medium 2505.

An operation of the digital camera 2500 having such a structure is described.

The image capturing section 2501 receives light reflected by an object to generate an analog signal which represents an image of the object. The image processing section 2502 converts an analog signal generated by the image capturing section 2501 to a digital signal so as to generate image data. The image data is moved to the monitor 2503, and the object which is represented by the image data is displayed on the monitor 2503. In this way, the monitor 2503 functions as a finder of the camera. When a user clicks a shutter provided in a main body of the digital camera, the memory control section 2504 records the image data, which represents the object displayed on the monitor 2503, in the information recording medium 2505. Once the image data is recorded in the information recording medium 2505, the memory control section 2504 can reproduce the image data recorded in the information recording medium 2505 and display the object which is represented by the image data on the monitor 2503. The information recording medium 2505 may be a memory incorporated in the main body of the digital camera 2500. Alternatively, the information recording medium 2505 may be a removable memory.

In order to edit (for example, compile, process, print, etc.) the image data recorded in the information recording medium 2505 in the above described manner, the information recording medium 2505 is directly connected to an external device, such as a personal computer, in the case where the information recording medium 2505 is an incorporated memory. Alternatively, in the case where the information recording medium 2505 is a removable memory, the information recording medium 2505 is removed from the main body of the digital camera 2500, and the removed information recording medium 2505 is inserted in a personal computer or the like. Then, a memory card reader, a disc drive, or the like, incorporated in the personal computer reads the image data recorded in the information recording medium 2505, and copies the image data into a fixed disc drive incorporated in the personal computer.

In the case where a user copies image data which represents an object captured by one digital camera into an information recording medium of another digital camera, the image data must be copied into a fixed disc drive included in a personal computer before it is copied into the another digital camera. This task requires labor and time, and cannot be achieved without using a personal computer which includes a memory card reader and a disc drive. For example, image data which represent objects captured by digital cameras cannot be transferred among the digital cameras in an environment where there is no personal computer, e.g., outdoors.

SUMMARY OF THE INVENTION

According to one aspect of the present invention, a digital camera includes: an image capturing section for capturing an image of an object; an image data generation section for generating image data which represents the captured image of the object and index data associated with the image data; a display section for displaying the image data and the index data; a recording/reproducing section for recording the image data and the index data in a memory section and reproducing the image data and the index data recorded in the memory section; a data communication section for sending the image data and the index data, which are recorded in the memory section, to an external device, and receiving image data and index data from the external device; and a control section for controlling the image data generation section, the recording/reproducing section, and the data communication section, wherein the control section controls establishment of a communication between the digital camera and the external device, and controls the data communication section to receive the index data from the external device, the control section controls the recording/reproducing section to record the received index data in the memory section, and controls the image data generation section to display at least one index which is represented by the received index data on the display section, and the control section controls the data communication section to receive, from the external device, image data associated with an index selected by a user from among the at least one index displayed on the display section, and controls the recording/reproducing section to record the received image data in the memory section.

In one embodiment of the present invention, the index is a thumbnail image.

In another embodiment of the present invention, the control section controls the data communication section to send to the external device an instruction for deleting image data associated with the selected index.

In still another embodiment of the present invention, the data communication section uses a communication cable or a wireless communication system.

In still another embodiment of the present invention, the display section further includes contact-type input means.

In still another embodiment of the present invention, the control section controls the data communication section so as to receive from the external device only information corresponding to a difference between the index data recorded in the memory section and the index data modified in the external device.

In still another embodiment of the present invention, the memory section includes a rewritable optical recording medium or a rewritable semiconductor memory.

In still another embodiment of the present invention, the image data generation section generates image data and index data such that each of the image data and index data has a display prohibition flag which prevents reception of the image data or index data by the external device.

In still another embodiment of the present invention, the control section determines whether or not the index data from the external device has a display prohibition flag; and if the index data has the display prohibition flag, the control section controls the data communication section so as not to receive the index data having the display prohibition flag and image data associated with the index data.

In still another embodiment of the present invention, the digital camera has a unique identification number; the control section compares the unique identification number of the digital camera with an identification number unique to the external device; and if the control section determines as a result of the comparison that the external device is an authenticatable device, a communication between the digital camera and the external device is established.

In still another embodiment of the present invention, the control section controls the recording/reproducing section to record image data and index data generated by the image data generation section in the memory section in units of a folder; the folder has a hierarchical directory structure.

In still another embodiment of the present invention, the control section controls the recording/reproducing section to reproduce the image data and the index data recorded in a certain layer of the hierarchical directory structure in the memory section; and the control section controls the image data generation section to display the reproduced image data and index data on the display section.

Thus, the invention described herein makes possible the advantages of providing a digital camera which can receive only image data a user wants to get from among image data which represents an object captured by another digital camera and which is recorded in an information recording medium incorporated therein without using a personal computer.

These and other advantages of the present invention will become apparent to those skilled in the art upon reading and understanding the following detailed description with reference to the accompanying figures.

DESCRIPTION OF THE PREFERRED EMBODIMENTS

Hereinafter, embodiments of the present invention will be described with reference to FIGS. 1 and 24.

1. Structure of Digital Camera of the Present Invention

Figure 1:
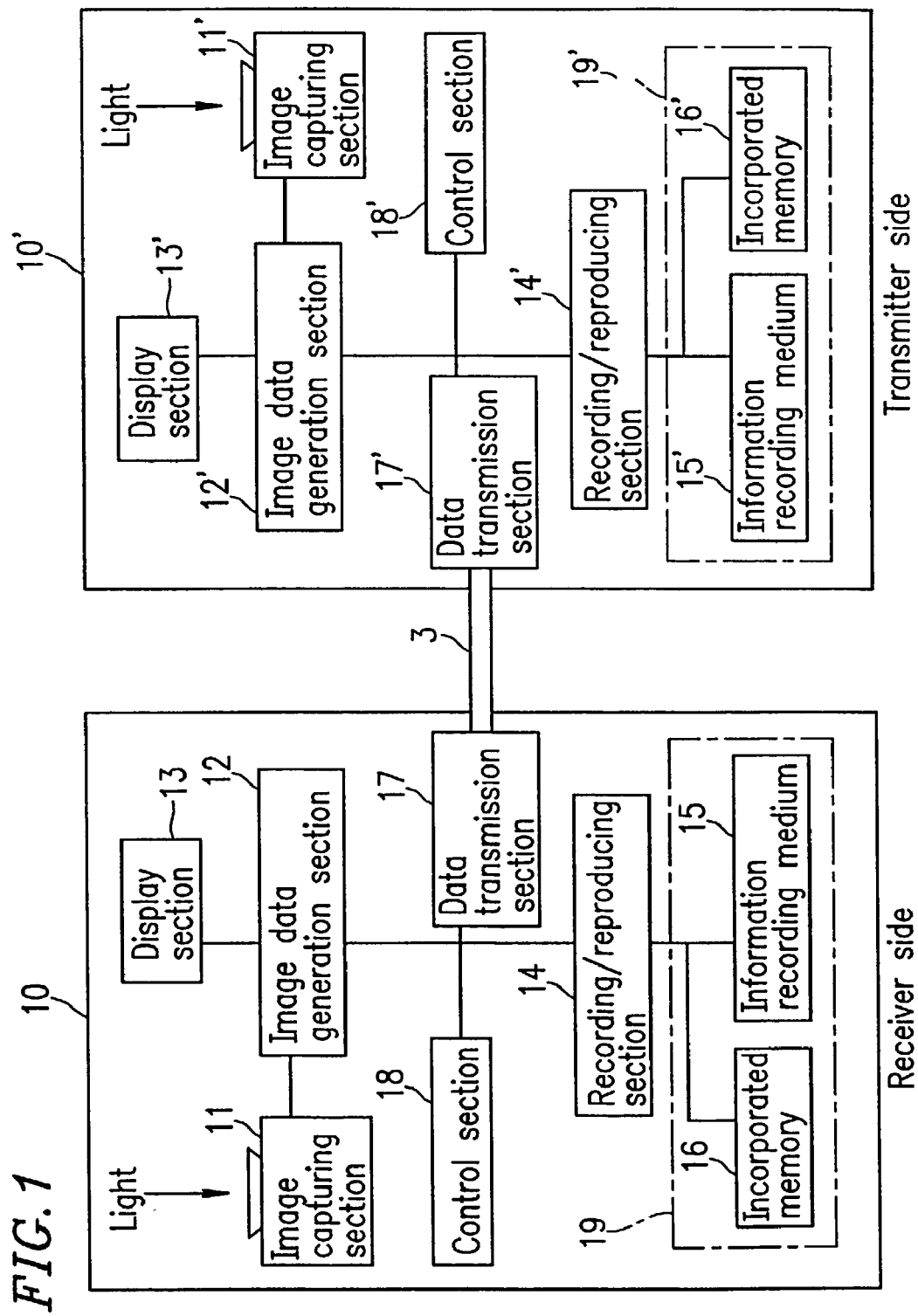
FIG. 1 shows a structure of a receiver digital camera 10 and a transmitter digital camera 10' of the present invention.

FIG. 1 shows a structure of a receiver digital camera 10 and a transmitter digital camera 10' of the present invention. Although in this example, these digital cameras are referred to as "receiver" and "transmitter" digital cameras for convenience of explanation, the receiver digital camera 10 and transmitter digital camera 10' have identical structures and functions, and each of them has both a data transmitting function and a data receiving function.

The receiver digital camera 10 of the present invention includes an image capturing section 11, an image data generation section 12, a display section 13, a recording/reproducing section 14, a data transmission section 17, a control section 18, and a memory section 19. The control section 18 controls the image data generation section 12, the recording/reproducing section 14, and the data transmission section 17. The memory section 19 includes an incorporated memory 16 and an information recording medium 15. The information recording medium 15 may be removable from the memory section 19, or alternatively may be fixedly incorporated in the memory section 19. The information recording medium 15 is a rewritable information recording medium which deals with a digital signal. The information recording medium 15 may be, for example, a semiconductor memory, an optical disc, a floppy disc, or the like. In this specification, an "image" refers to a still image or a moving image. In the case where image data represents a still image, it is preferable to use a rewritable high-speed semiconductor memory as the information recording medium 15. In the case where image data represents a moving image, it is preferable to use an optical disc having a large capacity as the information recording medium 15.

The image capturing section 11 receives light reflected by an object to generate an analog signal according to the amount of the received light.

The image generation section 12 converts an analog signal generated by the image capturing section 11 to a digital signal. This digital signal is image data which represents the object. The image data is transferred to the display section 13, such as a monitor or the like, and displayed on the display section 13. The display section 13 functions as a view finder of the camera. When a user clicks a shutter provided in a main body of the digital camera 10, the image generation section 12 generates image data which represents the object and index data which is associated with the image data. The generated image data and index data are transferred to the recording/reproducing section 14. The index data is any type of data which represents contents of the image data and whose data size is smaller than that of the image data. The index data may be, for example, text data which represents an image by a text, or thumbnail image data which represents a reduced size image. The index data is preferably thumbnail image data which represents a reduced size image of the image which is represented by the image data. In the case where the image is a still image, the thumbnail image is a reduced size image of the still image. In the case where the image is a moving image, the thumbnail image is an initial frame of the moving image. Index data, such as thumbnail image data, text data, etc., has a smaller data size than that of image data, and therefore, the index data can be quickly displayed on the display section 13 as compared with a case where the image data is displayed on the display section 13. In the examples described below in this specification, the index data is thumbnail image data.

The recording/reproducing section 14 records the image data and thumbnail image data (index data) generated by the image generation section 12 in the information recording medium 15 or incorporated memory 16 and/or reproduces the image data and thumbnail image data recorded in the information recording medium 15 or incorporated memory 16. A plurality of thumbnail images, which have been recorded in the information recording medium 15 or incorporated memory 16 in the above described manner, can be displayed at a time on the display section 13. Thus, a user can readily confirm the contents of the image recorded in the information recording medium 15 or incorporated memory 16.

The data transmission section 17 transmits/receives the image data and the thumbnail image data to/from an external device (digital camera 10'). The data transmission section 17 may be any type of communication means, such as a connection cable, wireless communication means, or the like. In the example illustrated in FIG. 1, the receiver digital camera 10 and the transmitter digital camera 10' are connected via a connection cable 3.

The display section 13 may be a monitor which includes an interface through which a user can input some data.

In this example, the external device connected to the receiver digital camera 10 is the transmitter digital camera 10'. The transmitter digital camera 10' includes an image capturing section 11', an image data generation section 12', a display section 13', a recording/reproducing section 14', a data transmission section 17', a control section 18', and a memory section 19'. The control section 18' controls the image data generation section 12', the recording/reproducing section 14', and the data transmission section 17'. The memory section 19' includes an incorporated memory 16' and an information recording medium 15'. Since the transmitter digital camera 10' has the same structure and functions as those of the receiver digital camera 10, detailed descriptions thereof are herein omitted.

A procedure for capturing an image of an object using the digital camera 10 having the above structure is described below.

2. Capturing an Image of an Object

Figure 2:
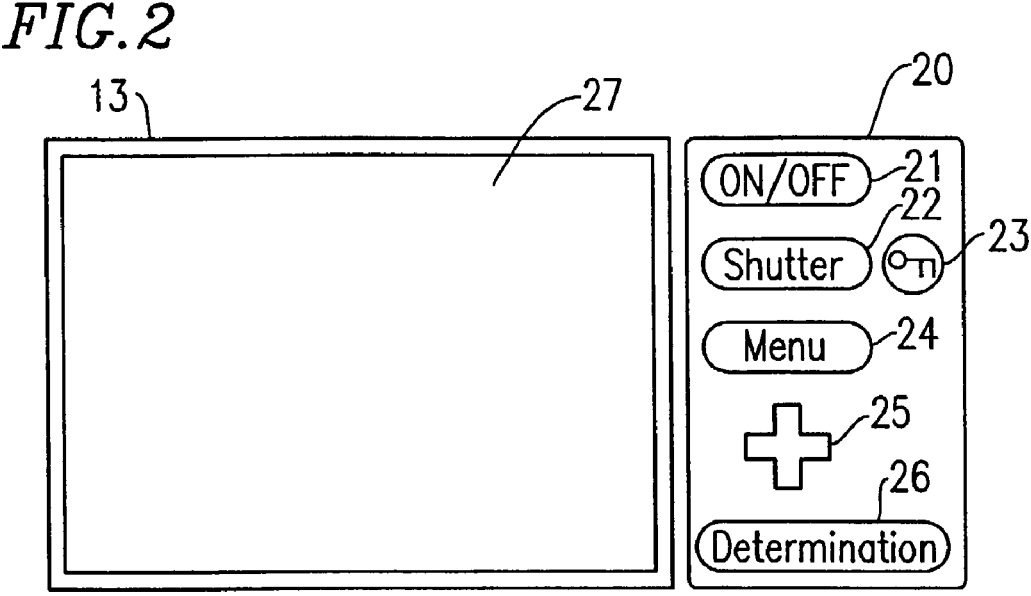
FIG. 2 shows a display 27 and a control panel 20 of a display section 13 when the power of the digital camera 10 is off.

FIG. 2 shows a display 27 and a control panel 20 of the display section 13 when the power of the digital camera 10 is off. The display section 13 may be a monitor which includes an interface through which a user can input some data. In this embodiment, the display section 13 is a pointing device which utilizes a movable cursor and a control button. The control panel 20 includes: an ON/OFF button 21 for turning ON/OFF the power of the digital camera 10; a shutter 22 for capturing an image of an object; a lock button 23 for protecting recorded image data and thumbnail image data; a menu button 24 for switching operation modes of the digital camera 10; a cross button 25 for vertically and horizontally moving a highlighted display region; and a determination button 26 for determining an execution of an operation. The control panel 20 shown in FIG. 2 is merely an example, and the present invention is not limited to such an illustrated button structure of the control panel 20. The control panel 20 can be provided at any position of the main body of the digital camera 10. Since the power of the digital camera 10 is off in the example illustrated in FIG. 2, nothing is displayed on the display 27 of the display section 13.

Figure 3:
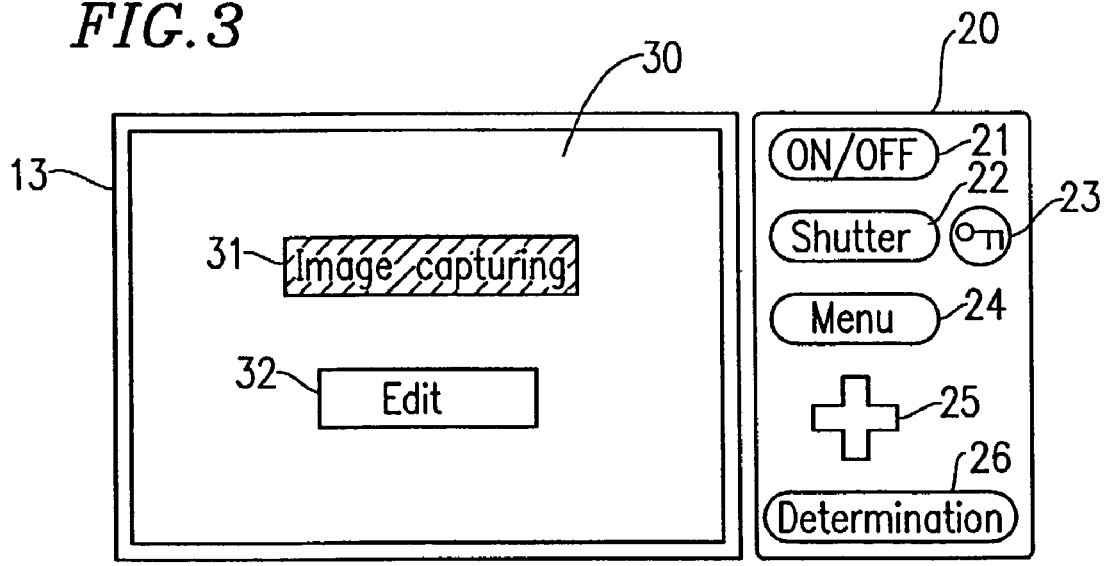
FIG. 3 shows a display 30 and the control panel 20 of the display section 13.

FIG. 3 shows a display 30 and the control panel 20 of the display section 13. When the ON/OFF button 21 is depressed, the power of the digital camera 10 is turned on, and the display section 13 displays the menu display 30 as shown in FIG. 3. The menu display 30 is also displayed when the menu button 24 of the control panel 20 is depressed. The menu display 30 includes an image capturing button 31 and an edit button 32. By selecting the image capturing button 31, a user can input any setting details before capturing an image of an object (image capturing mode). After an image of an object has been captured, by selecting the edit button 32, a user can input any setting details for editing the captured image (edit mode). In FIG. 3, a highlighted display region is present on the image capturing button 31. The highlighted display region can be moved using the cross button 25 in the control panel 20.

Figure 4:
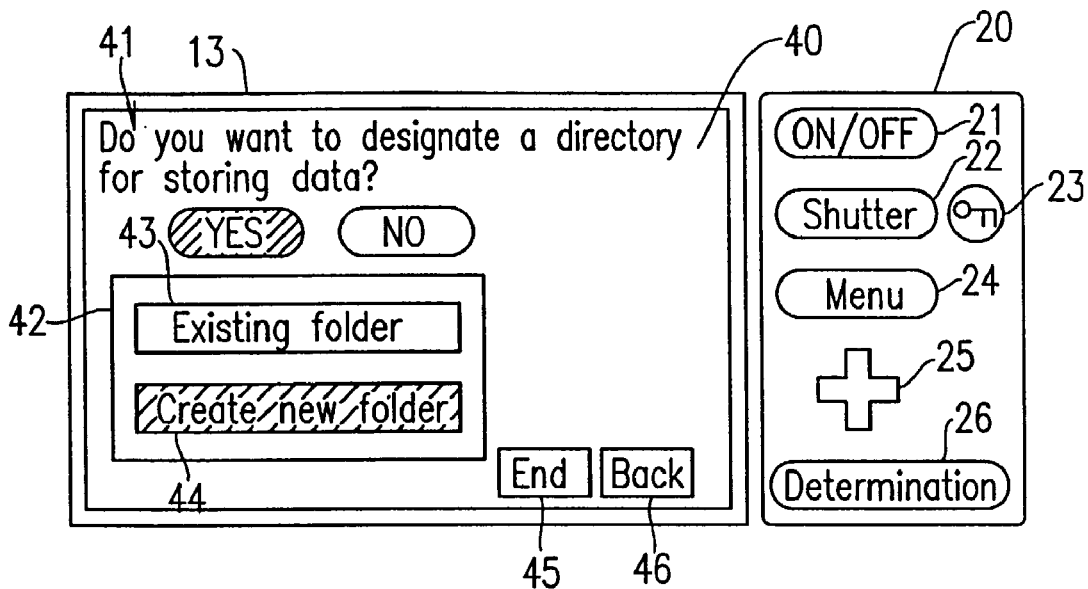
FIG. 4 shows a display 40 and the control panel 20 of the display section 13.

FIG. 4 shows a display 40 and the control panel 20 of the display section 13. When a user depresses the determination button 26 while the highlighted display region is present on the image capturing button 31 in the menu display 30 of FIG. 3, the display section 13 displays the display 40 of FIG. 4. In the display 40, a user can designate a place in the information recording medium 15 where image data which represents a captured image and thumbnail image data associated with the image data are to be stored. If a user select a "YES" button in response to a message 41 "Do you want to designate a directory for storing data?", a new window 42 is generated on the display 40. In the window 42, an "existing folder" button 43 and a "create new folder" button 44 are displayed. In the case where the user selects the "existing folder" button 43, a list of existing folders (not shown) stored in the information recording medium 15 is displayed on the display section 13. After a user selects a desired folder from the displayed list of existing folders, image data and thumbnail image data, which are generated after an image of an object has been captured, are stored in the selected folder. The display 40 further includes an end button 45 and a back button 46. When a user selects the end button 45, the display of the display section 13 returns to the menu display 30 of FIG. 3. When a user selects the back button 46, the user can returns to a previous manipulation (or entry) step.

Figure 5:
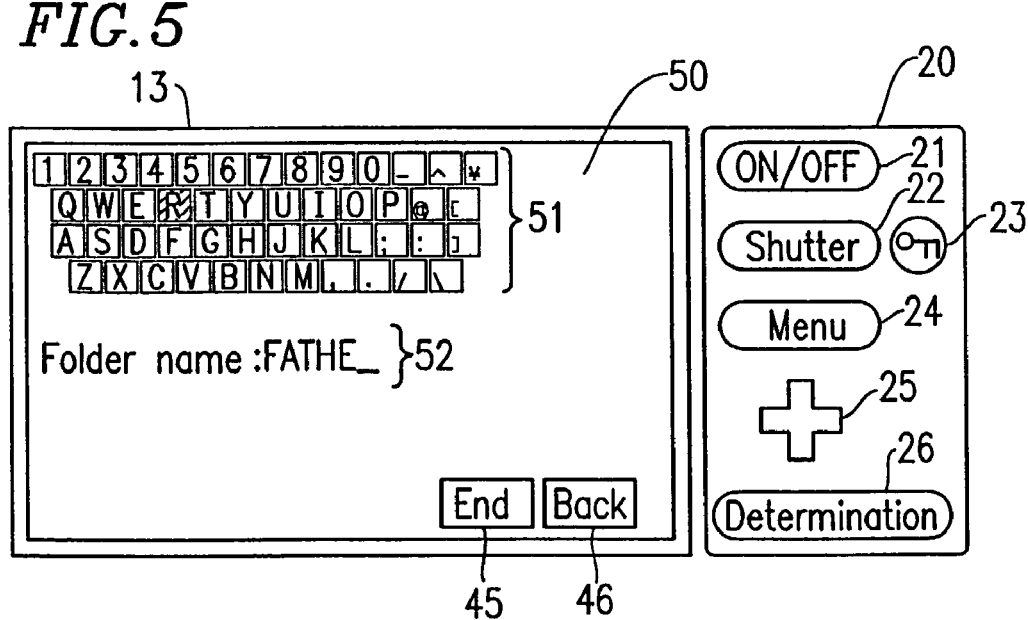
FIG. 5 shows a display 50 and the control panel 20 of the display section 13.

FIG. 5 shows a display 50 and the control panel 20 of the display section 13. When a user selects the "create new folder" button 44" in the display 40 of FIG. 4, the display section 13 displays the display 50 for giving a folder name to the newly created folder. The display 50 includes a keyboard entry section 51 and a folder name field 52 for entering a folder name. The keyboard entry section 51 has the same function as that of an actual keyboard. In the example illustrated in FIG. 5, "FATHE_" has already been entered in the folder name field 52. When a user selects an "R" key in the keyboard entry section 51, the folder name field 52 is changed to "FATHER". In this way, a user can create a folder and give a folder name to the newly created folder.

Such an arrangement where sets of image data which represent a captured image and thumbnail image data are stored in separate folders is useful, for example, in the case where a plurality of users share one digital camera 10, or where a user wants to sort out sets of image data and thumbnail image data according to the purposes thereof.

Figure 6:
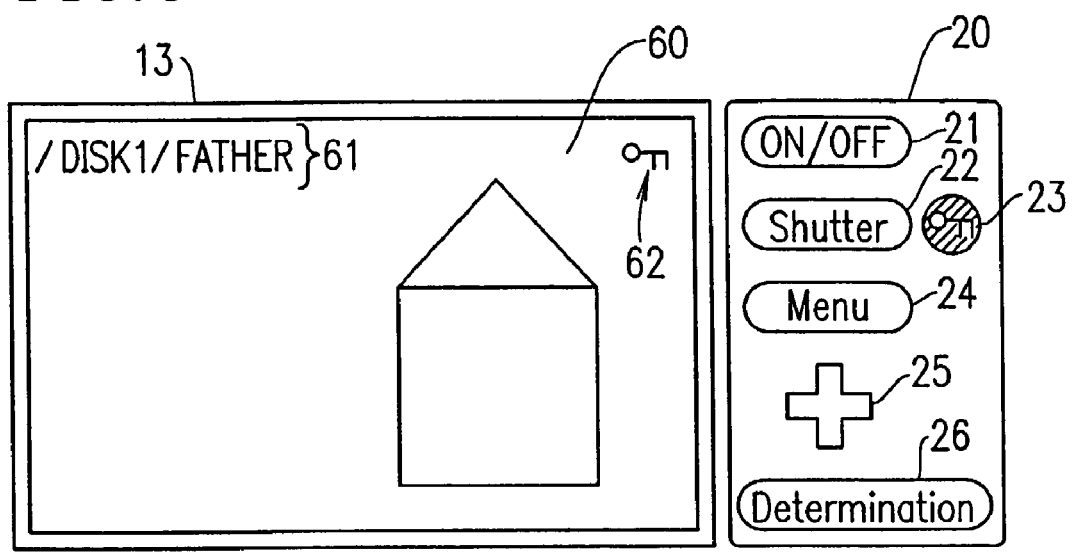
FIG. 6 shows a display 60 and the control panel 20 of the display section 13.

FIG. 6 shows a display 60 and the control panel 20 of the display section 13. When a user gives a folder name and selects the end button 45 in the display 50 of FIG. 5, the display section 13 displays the display 60 which functions as a finder of the digital camera 10. The display 60 includes: an address 61 which indicates an address where image data and thumbnail image data are to be stored; a lock mark 62 which represents that an image to be captured next is an image to be protected; an image which can be captured by the digital camera 10 (in this example, a house). In the example illustrated in FIG. 6, the address 61 indicates that the data are to be stored in the FATHER folder of DISK1 which represents the information recording medium 15. In the case where a user wants to protect image data, the user simply depresses a lock button 23 in the control panel 20.

In the example illustrated in FIG. 6, when the lock button 23 is depressed, the lock button 23 is lightened so as to indicate that the lock button 23 is active, and the lock mark 62 is displayed on the display 60. In this specification, "protect" and "lock" means adding a display prohibition flag to image data and thumbnail image data for prohibiting display, copying, and moving of image data and thumbnail image data from the digital camera 10 to an external device, or for enabling only a specific individual user who uses the digital camera 10 to view the display of the image data and thumbnail image data using a password system or the like. In this embodiment, it is assumed that the display prohibition flag is added to image data and thumbnail image data for the purpose of prohibiting display, copying, and moving of image data and thumbnail image data from the digital camera 10 to an external device.

Further, the control panel 20 may include a copyright protection button for adding a copyright protection data section to the image data. In the case where image data is copied or moved to another digital camera, the copyright of the image data can be protected by limiting the number of times of copying or moving utilizing the copyright protection data section to the image data. Furthermore, by utilizing a copyright protection function provided to a digital camera, image data is prevented from being digitally duplicated into an indefinite number of copies, and accordingly, production of quality-degraded copies of the image data generated by a user can be prevented.

Figure 7:
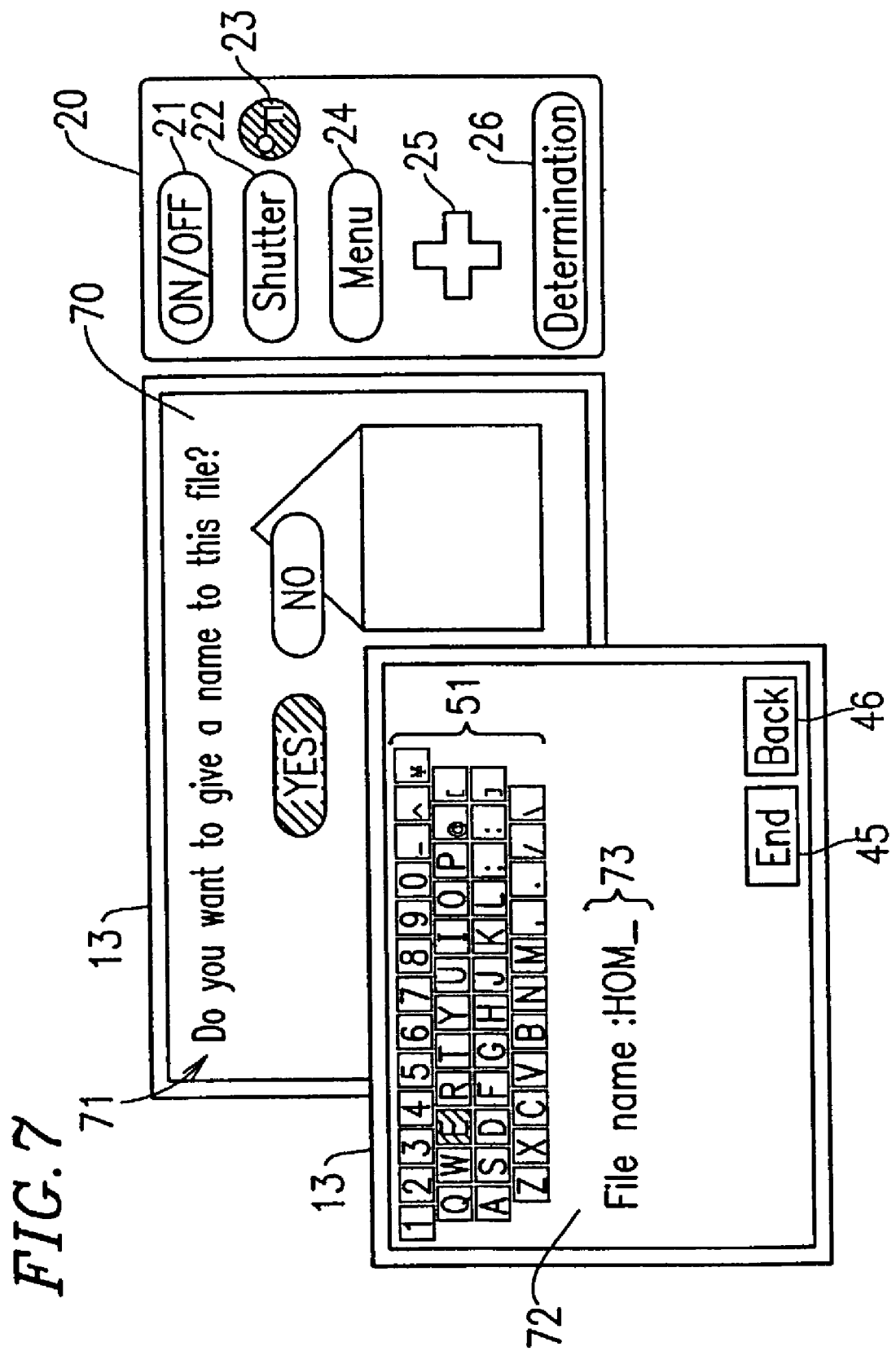
FIG. 7 shows a display 70 and the control panel 20 of the display section 13.

FIG. 7 shows a display 70 and the control panel 20 of the display section 13. When a user clicks the shutter 22 of the control panel 20 in the display 60 of FIG. 6, an image shown in the display 60 (an image of a house) is captured into the digital camera 10. Then, the display section 13 displays the display 70 shown in FIG. 7. In the display 70, a user can give a file name to image data which represents the captured image. If a user select a "YES" button in response to a message 71 "Do you want to give a name to this file?", the display section 13 generates a new display 72. The display 72 includes a keyboard entry section 51 and a file name field 73 for entering a file name, which have the same functions as the keyboard entry section 51 and the folder name field 52 in the display 50 of FIG. 5. In the display 72, a user can give a file name to the image data in a similar manner as that described in the example illustrated in FIG. 5. The file name given to the image data is also simultaneously given to thumbnail image data associated with the image data in an automatic manner.

Due to such a file name given to image data which represents a captured image, a user can readily sort out image data and can readily understand the content of the image data without reproducing the image data.

It should be noted that, as a matter of course, a place (address) where image data and thumbnail image data are to be stored, a folder name, and a file name can be determined after an image has been captured.

Figure 8:
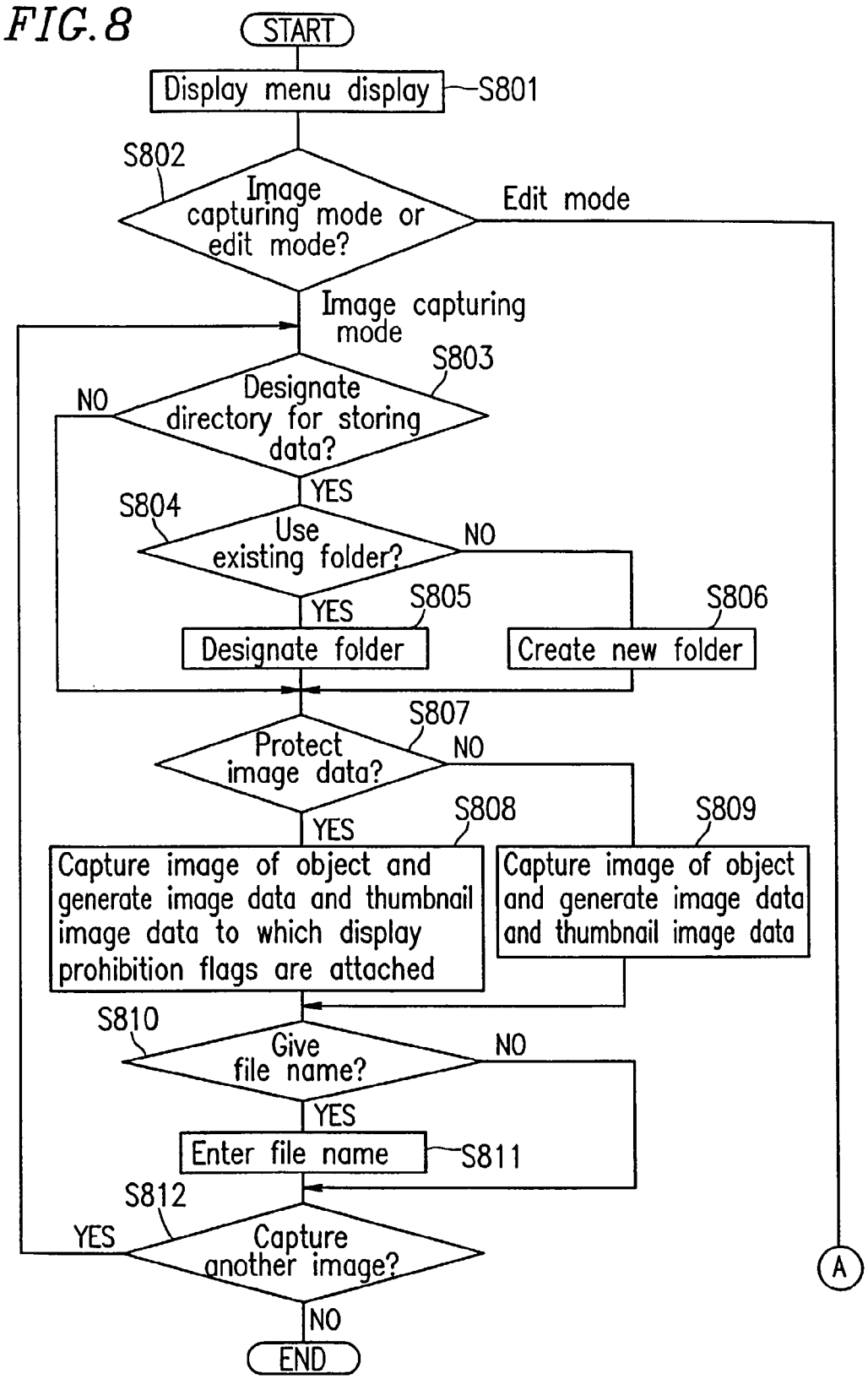
FIG. 8 is a flowchart which illustrates a process performed in a control section 18 when an image of an object is captured by the digital camera 10 of the present invention.

FIG. 8 is a flowchart which illustrates a process performed in the control section 18 when an image of an object is captured by the digital camera 10 of the present invention. Steps of the process performed in the control section 18 are described below.

Step S801: When the control section 18 (FIG. 1) determines that a user depressed the ON/OFF button 21 of the control panel 20 of FIG. 2, the control section 18 instructs the image data generation section 12 to display the menu display 30 of FIG. 3 on the display section 13 (FIG. 1).

Step S802: The control section 18 determines which of the image capturing button 31 and the edit button 32, shown in the menu display 30, is selected by a user. If the control section 18 determines that the user selected the image capturing button 31, the process proceeds to Step S803, and the operation mode of the digital camera 10 is changed to the image capturing mode. If the control section 18 determines that the user selected the edit button 32, the process proceeds to a process shown in FIG. 9, and the operation mode of the digital camera 10 is changed to the edit mode (A).

Step S803: If the control section 18 determines at Step S802 that the user selected the image capturing button 31, the control section 18 instructs the image data generation section 12 to display the display 40 of FIG. 4 on the display section 13. If the user select a "YES" button in response to a message 41 "Do you want to designate a directory for storing data?", the process proceeds to Step S804, and a new window 42 (FIG. 4) is generated on the display 40. Otherwise, the process proceeds to Step S807 without designating a place where the image data and thumbnail image data, which will be generated after an image capturing operation, are to be stored.

Step S804: The control section 18 determines which of the "existing folder" button 43 and the "create new folder" button 44, shown in the window 42, is selected by a user. If the control section 18 determines that the user selected the "existing folder" button 43, the process proceeds to Step S805. If the control section 18 determines that the user selected the "create new folder" button 44, the process proceeds to Step S806.

Step S805: If the control section 18 determines at Step S804 that the user selected the "existing folder" button 43, the control section 18 instructs the image data generation section 12 to display a list of existing folders on the display section 13. Then, the control section 18 determines which of the existing folders is selected by the user, and designates the selected folder as a folder in which image data and thumbnail image data, which will be generated after an image capturing operation, are to be stored. Then, the process proceeds to Step S807.

Step S806: If the control section 18 determines at Step S804 that the user selected the "create new folder" button 44, the control section 18 instructs the image data generation section 12 to display the display 50 of FIG. 5 on the display section 13. Then, the user enters any folder name using the keyboard entry section 51, the cross button 25, and the determination button 26. The control section 18 designates a newly created folder having a new name ("FATHER" folder in the example illustrated in FIG. 5) as a folder where image data and thumbnail image data, which will be generated after an image capturing operation, are to be stored. Then, the process proceeds to Step S807.

Step S807: The control section 18 determines whether or not the user depresses the lock button 23 in the control panel 20. If the control section 18 determines that the user depressed the lock button 23, the process proceeds to Step S808. Otherwise, the process proceeds to Step S809.

Step S808: When the user clicks the shutter 22 in the control panel 20 to capture an image of an object, the control section 18 instructs the image data generation section 12 to generate image data and thumbnail image data to which display prohibition flags are attached. Then, the process proceeds to Step S810.

Step S809: When the user clicks the shutter 22 in the control panel 20 to capture an image of an object, the control section 18 instructs the image data generation section 12 to generate image data and thumbnail image data. Then, the process proceeds to Step S810.

Step S810: The control section 18 instructs the image data generation section 12 to display on the display section 13 the display 70 (FIG. 7) which inquires a user whether he/she wants to give a file name to the image data generated at Step S808 or Step S809. If the control section 18 determines that the user selected a "YES" button in response to the message 71 "Do you want to give a name to the file?", the control section 18 instructs the image data generation section 12 to generate the new display 72 on the display section 13. Then, the process proceeds to Step S811. Otherwise, the process proceeds to Step S812.

Step S811: The user enters any folder name using the keyboard entry section 51, the cross button 25, and the determination button 26 in the same manner as that of Step S806. The control section 18 designates the file name entered by the user ("HOME" file in the example illustrated in FIG. 7) as the file names of the image data and thumbnail image data generated at Step S808 or Step S809. If the user selects "NO" at Step S810, a default file name, such as "image1", "image2", . . . , for example, is selected as the file names of the image data and thumbnail image data generated at Step S808 or Step S809.

The control section 18 controls the recording/reproducing section 14 (FIG. 1) to record the thus-generated image data and thumbnail image data associated there within the information recording medium 15 of the memory section 19 (FIG. 1). Then, the process proceeds to Step S812.

Step S812: The control section 18 instructs the image data generation section 12 to generate on the display section 13 a display (not shown) which inquires the user whether or not he/she wants to continue capturing another image. If the control section 18 determines that the user selected "YES" to continue the image capturing operation, the process returns to Step S803 to perform the above described steps again. Otherwise, the image capturing mode is canceled, and the image capturing operation is terminated.

Designation and determination of a folder name performed at Steps S802–S806, and determination of a file name performed at Steps S810–S811, can alternatively be performed by the user in the edit mode, which will be described later.

Next, the structure of image data generated based on an image captured by the digital camera 10 of the present invention is described.

3. Structure of Image Data

Figure 9:
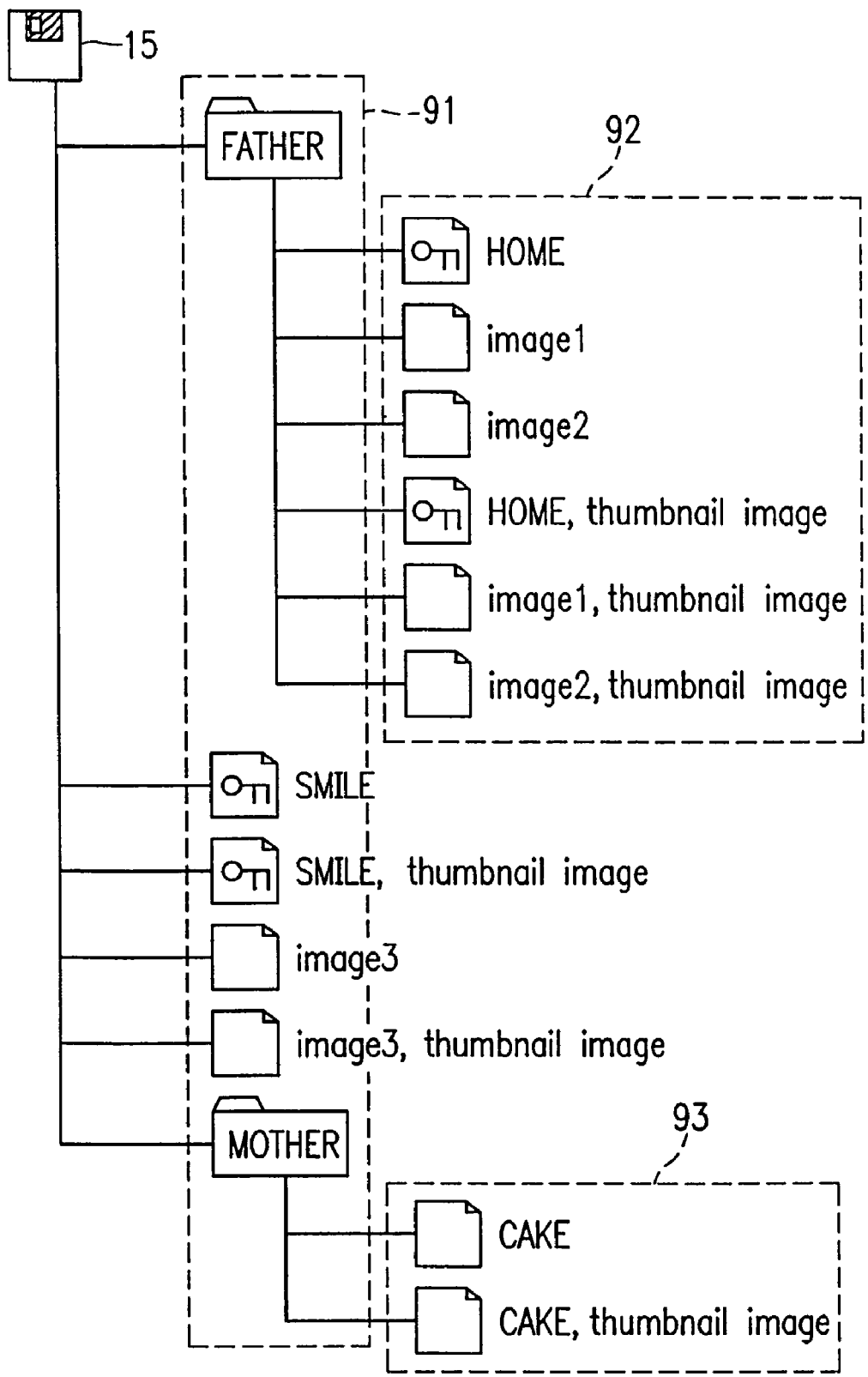
FIG. 9 shows a hierarchical directory structure of image data recorded in an information recording medium 15.

FIG. 9 shows a hierarchical directory structure of image data recorded in the information recording medium 15.

The exemplary hierarchical directory structure of image data recorded in the information recording medium 15 which is shown in FIG. 9 is obtained after the process of FIG. 8 is completed. In the example illustrated in FIG. 9, the highest layer 91 includes a FATHER folder, a "SMILE" image, a "SMILE" thumbnail image associated with the "SMILE" image, an "image3" image, an "image3" thumbnail image associated with the "image3" image, and a MOTHER folder. A subordinate layer 92, which is subordinate to the FATHER folder, includes a "HOME" image, a "HOME" thumbnail image associated with the "HOME" image, an "image1" image, an "image1" thumbnail image associated with the "image1" image, an "image2" image, and an "image2" thumbnail image associated with the "image2" image. Another subordinate layer 93, which is subordinate to the MOTHER folder, includes a "CAKE" image, and a "CAKE" thumbnail image associated with the "CAKE" image. It should be appreciated that the above hierarchical directory structure is just an example and may have any other structure.

Since image data is recorded together with thumbnail image data associated therewith in the information recording medium 15 based on the hierarchical directory structure, the user(s) can readily sort out image data according to various attributes (e.g., an image captured by a father, an image captured by a mother, date when an image was captured, a place where an image was captured, etc.), and can readily find image data the user wants to get.

Figure 10:
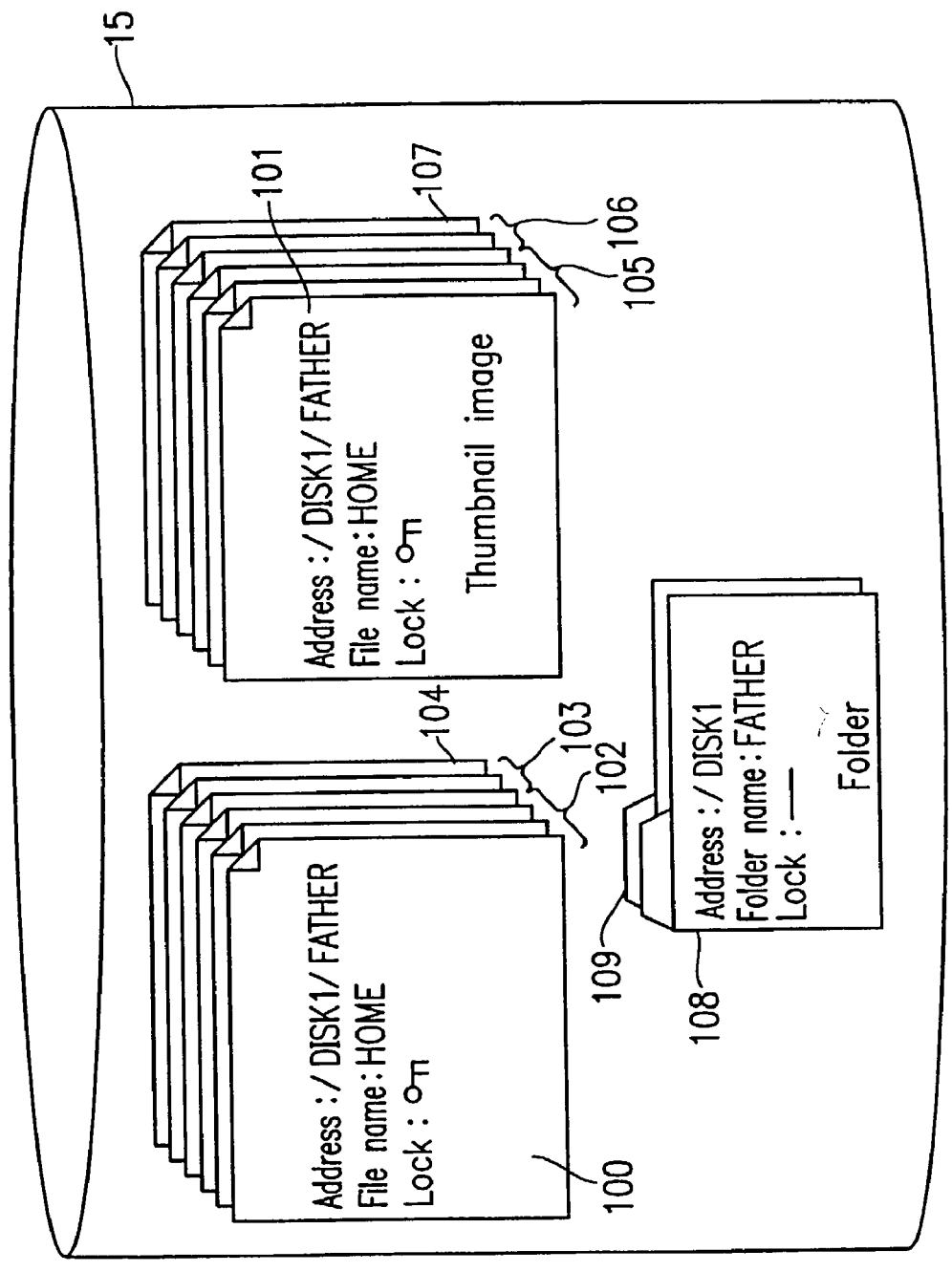
FIG. 10 schematically shows image data, thumbnail image data, and folder data, which are recorded in the information recording medium 15.

FIG. 10 schematically shows image data, thumbnail image data, and folder data, which are recorded in the information recording medium 15. In FIG. 10, image data includes, for example, an address where the image data is stored, a file name of the image data, and a protection status of the image data. In the example illustrated in FIG. 10, image data 100 is the "HOME" image included in the FATHER folder of FIG. 9, the address where the image data 100 is stored is "/DISK1/FATHER", and the file name of the image data 100 is "HOME". The protection status is represented by a lock key (i.e., display prohibition flag) which indicates that the image data is locked.

The folder data 108 and 109 each includes an address where the folder data 108 or 109 is stored, a folder name, a protection status, and information which indicates that the folder data 108 or 109 itself is a folder icon. The folder data 108 represents a folder icon of the FATHER folder, and the folder data 109 represents a folder icon of the MOTHER folder.

For example, in FIG. 10, a set of three image data, which is indicated by reference numeral 102, are image data regarded as being contained in the FATHER folder of FIG. 9. A set of two image data, which is indicated by reference numeral 103, are the "SMILE" image and "image3" image of FIG. 9. Image data indicated by reference numeral 104 is the "CAKE" image which is regarded as being contained in the MOTHER folder. In the case where the address to store image data is not designated, address "/DISK1", which is the highest layer of the information recording medium 15, is designated as an address to store such image data. In the case where a file name of image data is not designated, a default file name, e.g., "image1", is given to such image data. In the case where image data is not protected, a lock key which represents the protection status of the image data is not displayed.

In the example illustrated in FIG. 10, image data 101 is the "HOME" thumbnail image in the FATHER folder of FIG. 9. The image data 101 has the same information as that of the image data 100 except that the image data 101 includes information which indicates that the image data 101 itself is a thumbnail image. In this embodiment, the image data 100 and the image data 101 are associated with each other so as to have the same information (for example, an address to store image data, a file name, a protection status, etc.). However, the association of image data and corresponding thumbnail image data can be established in any manner so long as the image data and thumbnail image data can be associated on a one-to-one basis.

Three image data indicated by reference numeral 105 are thumbnail image data which are regarded as being stored in the FATHER folder of FIG. 9. Two image data, which is indicated by reference numeral 106, are the "SMILE" thumbnail image data and "image3" thumbnail image data of FIG. 9. Image data indicated by reference numeral 107 is the "CAKE" thumbnail image data which is regarded as being contained in the MOTHER folder.

Next, an operation of the digital camera 10 for editing image data is described below. In the following example, the image data shown in FIGS. 8 and 9 are recorded in the digital camera 10.

4. Edit of Image Data

Figure 11:
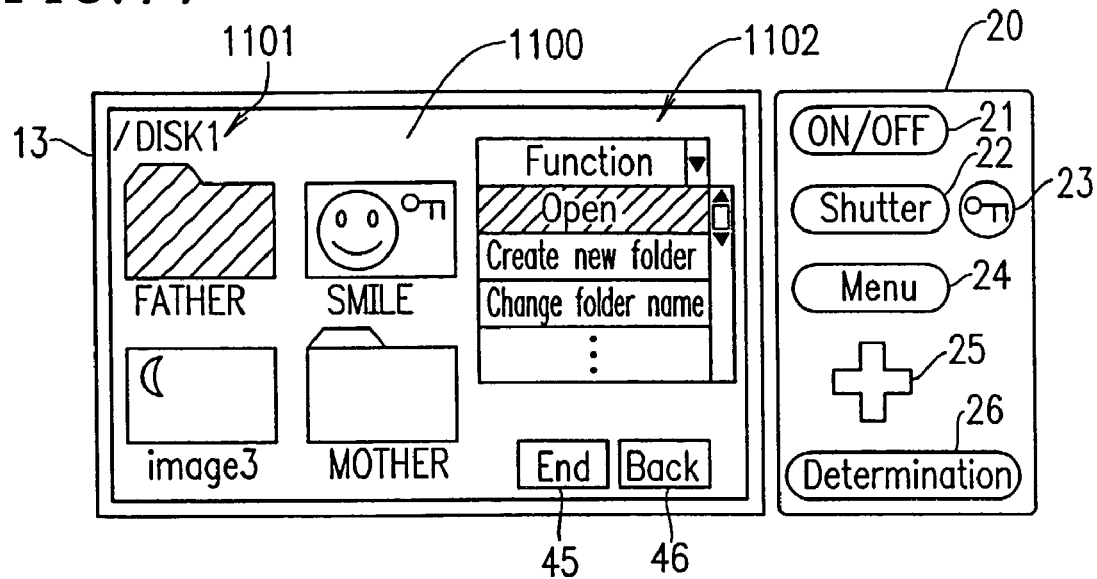
FIG. 11 shows a display 1100 on the display section 13 and the control panel 20.

FIG. 11 shows a display 1100 on the display section 13 and the control panel 20. When in the display 30 of FIG. 3, a user moves a highlighted display region to the edit button 32 and depresses the determination button 26, the display section 13 displays the display 1100 for performing edit of data. In the case where the image data are arranged in the hierarchical directory structure shown in FIG. 9, a thumbnail image in the highest layer 91 (i.e., the folder icon images (FATHER folder and MOTHER folder) and the "SMILE" image and "image3" image) are displayed on the display 1100. If the image data are arranged in a hierarchical directory structure, thumbnail images can be displayed in a hierarchical manner.

The display 1100 includes: an address 1101 indicating which layer the currently displayed thumbnail images belong to; a function button 1102; an end button 45, and a back button 46. In the example illustrated in FIG. 11, the address 1101 is "/DISK1", which indicates the highest layer. For example, the function button 1102 includes: an "open" button for opening a folder; a "create new folder" button for creating a new folder; a "change folder name" button for changing the name of a folder: a "change file name" button for changing the name of a file; a "delete" button for deleting a folder or file; a "cut" button for cutting a folder or file; a "paste" button for pasting a folder or file; a "copy" button for copying a folder or file; a "reproduction" button for reproducing a file; and a "change lock" button for changing the protection status of a file or folder. It should be noted that the function button 1102 is not limited to the above button structure. In the example illustrated in FIG. 11, the user selects the FATHER folder by placing the highlighted display region on the "open" button.

Figure 12:
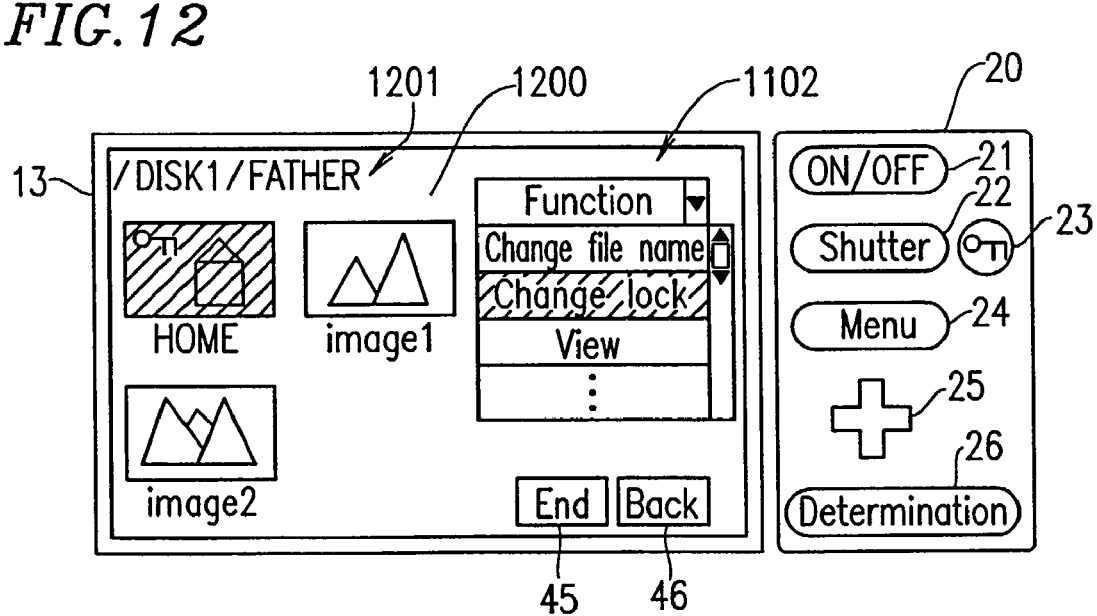
FIG. 12 shows a display 1200 on the display section 13 and the control panel 20.

FIG. 12 shows a display 1200 on the display section 13 and the control panel 20. When a user activates the "open" button while the FATHER folder of FIG. 11 is selected, the thumbnail images stored in the FATHER folder shown in the display 1200 are displayed on the display section 13. In the case where the image data are arranged in the hierarchical directory structure shown in FIG. 9, the thumbnail images in the subordinate layer 92 (i.e., the "HOME" thumbnail image, the "image1" thumbnail image, and the "image2" thumbnail image) are displayed on the display 1200. The display 1200 includes: an address 1201; a function button 1102; an end button 45, and a back button 46 same as the display 1100. The address 1201 is "/DISK1/FATHER", which indicates that the thumbnail image data displayed on the display 1200 of FIG. 12 are subordinate to the highest layer indicated by the address "/DISK1".

Figure 13:
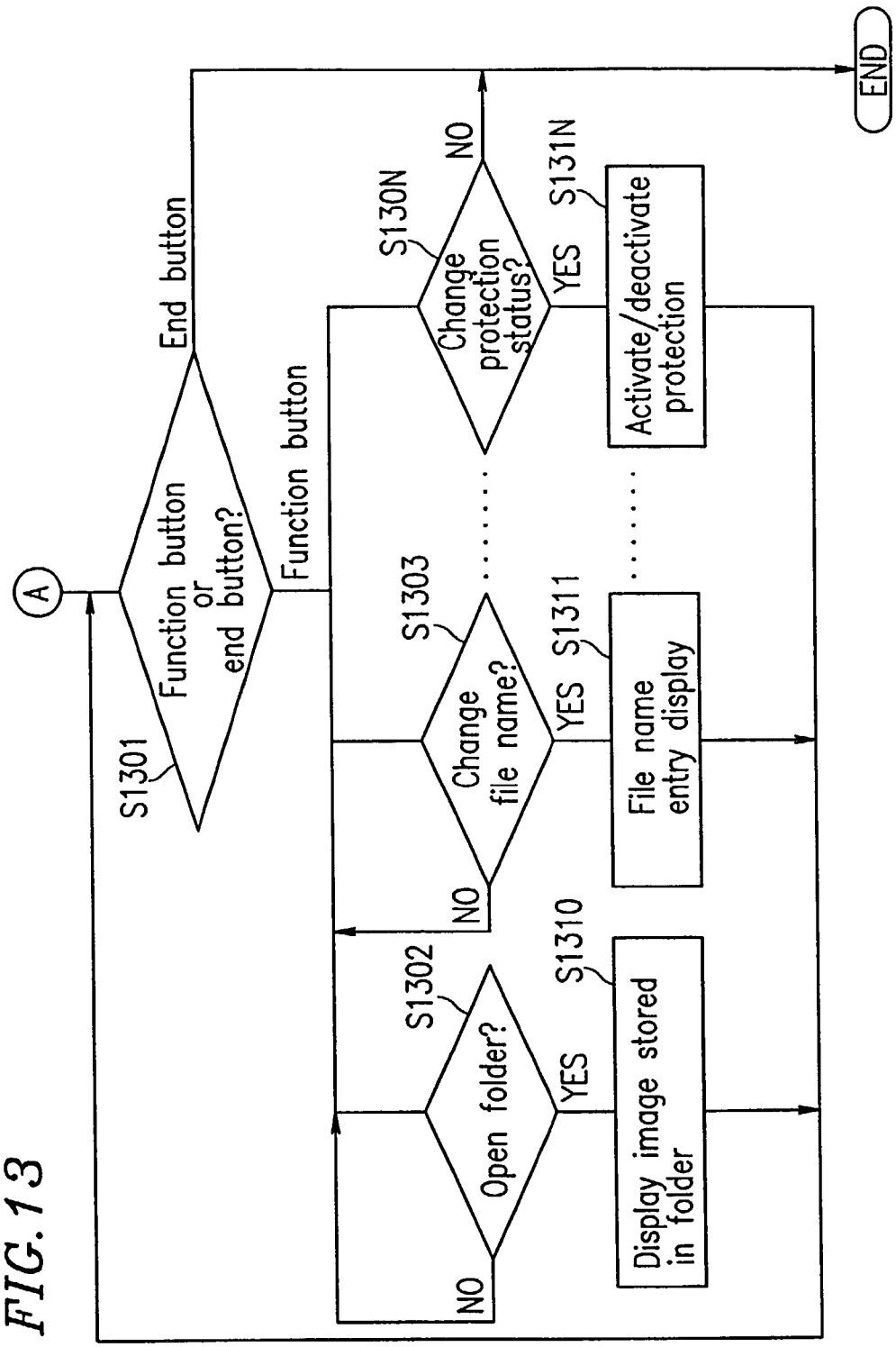
FIG. 13 is a flowchart which illustrates a process performed by a control section 18 for editing image data using the digital camera 10 of the present invention.

FIG. 13 is a flowchart which illustrates a process performed by the control section 18 for editing image data using the digital camera 10 of the present invention. Steps of the process performed by the control section 18 are described below. The process illustrated in FIG. 13 begins when the control section 18 determines at Step S802 of FIG. 8 that the user selected the edit button 32 in the menu display 30.

Step S1301: The control section 18 determines whether or not the user selected a desired thumbnail image displayed on a screen, and selected the function button(s) 1102 or the end button 45. When the control section 18 determines that the user selected the function button(s) 1102, the process proceeds to Steps S1302 through S130N. Otherwise, the process terminates.

Step S1302: The control section 18 determines whether or not the user selected the "open" button. When the control section 18 determines that the user selected the "open" button, the process proceeds to Step S1310. Otherwise, the process proceeds to Steps S1303 through S130N.

Step S1310: The control section 18 instructs the recording/reproducing section 14 to reproduce thumbnail image data stored in a selected folder, and display thumbnail images of the thumbnail image data on the display section 13. Then, the process returns to Step S1301, and the above described steps are performed again.

Step S1303: The control section 18 determines whether or not the user selected the "change file name" button. When the control section 18 determines that the user selected the "change file name" button, the process proceeds to Step S1311. Otherwise, the process proceeds to Steps S1304 (not shown) through S130N.

Step S1311: The control section 18 instructs the display section 13 to provide the display 72 as shown in FIG. 7 for entering a file name. Then, the control section 18 instructs the recording/reproducing section 14 to record a thumbnail image corresponding to the file name entered by the user in the information recording medium 15. Simultaneously, the file name of the thumbnail image is updated, and the name of an image associated with the thumbnail image is also updated. Thereafter, the process returns to Step S1301, and the above described steps are performed again.

Step S130N: The control section 18 determines whether or not the user selected the "change lock" button. When the control section 18 determines that the user selected the "change lock" button, the process proceeds to Step S131N. Otherwise, the process terminates.

Step S131N: The control section 18 inquires of the user whether or not he/she is willing to activate/deactivate protection for the selected thumbnail image data. If the user is willing to activate protection for the selected thumbnail image data, the control section 18 adds display prohibition flags to thumbnail image data and image data associated with the thumbnail image data, and instructs the recording/reproducing section 14 to write the thumbnail image data and image data associated with the thumbnail image data having the display prohibition flags over the information recording medium 15. If the user is willing to deactivate protection for the selected thumbnail image data, the control section 18 instructs the recording/reproducing section 14 to delete the display prohibition flags from the thumbnail image data and image data associated with the thumbnail image data, and write the thumbnail image data and image data associated with the thumbnail image data, from which the display prohibition flags have been deleted, over the information recording medium 15. Thereafter, the process returns to Step S1301, and the above described steps are performed again.

In the example illustrated in FIG. 13, for simplicity of explanation, only the process performed by the control section 18 when the "open" button, the "file name change" button, and the "change lock" button are selected from the function button 1102, has been described. Even when any other function button 1102 is selected, the control section 18 performs appropriate processing.

Figure 14:
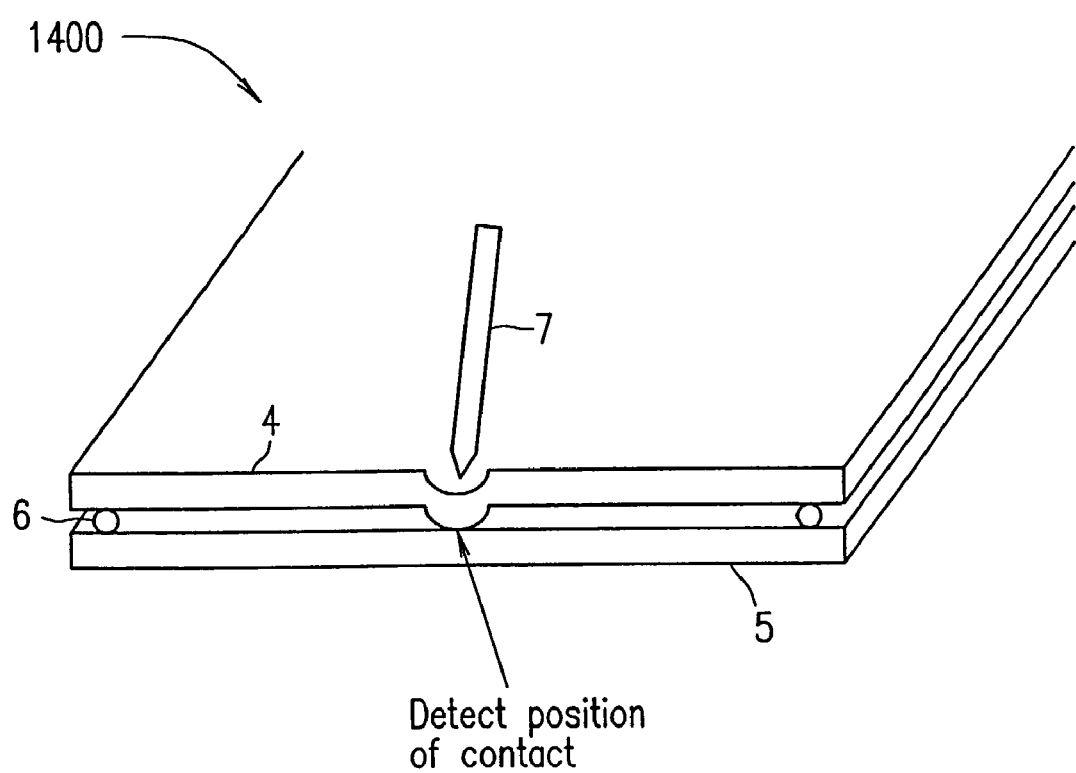
FIG. 14 shows the structure of a touch panel monitor 1400.

FIG. 14 shows the structure of a touch panel monitor 1400.

In the display section 13 of the above described example, the monitor including an interface through which a user can input certain data is achieved by the cross button 25 and the determination button 26. However, the display section 13 of the present invention may be a touch panel monitor (contact-type input means).

The touch panel monitor 1400 includes an upper transparent electrode 4, and a lower transparent electrode 5, and spacers 6 provided between the upper transparent electrode 4 and the lower transparent electrode 5. With the spacers 6, a certain gap is provided between the upper transparent electrode 4 and the lower transparent electrode 5. Entry by a user is received by detecting a position of a contact made between the upper transparent electrode 4 and the lower transparent electrode 5.

For example, a user can input data by directly touching a surface of the monitor 1400 with a pen-shaped stylus 7. Specifically, for example, a thumbnail image is selected by touching the thumbnail image once, and by touching a function button once, processing corresponding to the touched function button is performed on the selected thumbnail image. Alternatively, by continuously touching a thumbnail image twice, an image corresponding to the touched thumbnail image is displayed on the monitor 1400. A touch panel monitor using a stylus is a pointing device which enables intuitive manipulation, and is frequently used in a portable information terminal or the like. In the case where a touch panel monitor is used, complicated button manipulation or the like is not necessary. As a matter of course, a touch panel monitor and another type of pointing device can be used in combination.

Next, the receiver digital camera 10 and the transmitter digital camera 10' of the present invention are connected, and an operation for transmitting/receiving image data between the digital cameras 10 and 10' is described.

Figure 15:
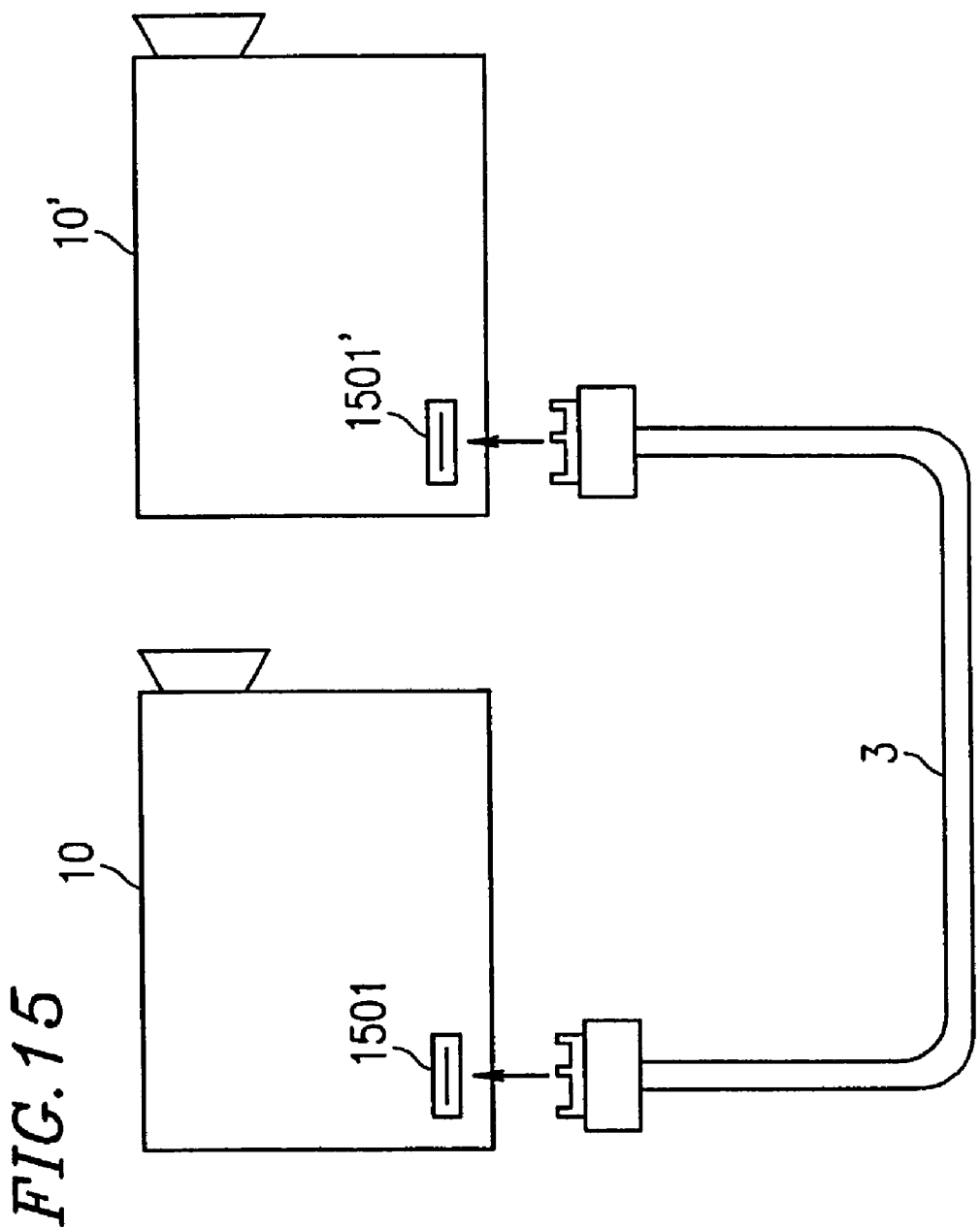
FIG. 15 schematically shows digital cameras connected using a connection cable.

5. Transmission/Reception of Data Between Digital Cameras (1) Establishment of Communication Between Digital Cameras FIG. 15 schematically shows digital cameras connected using a connection cable.

The receiver digital camera 10 and the transmitter digital camera 10' (FIG. 1) are physically connected by a connection cable 3. The receiver digital camera 10 has a connector 1501 provided at the data transmission section 17. The transmitter digital camera 10' also has a connector 1501' provided at the data transmission section 17'. The connection cable 3 connects the receiver digital camera 10 and the transmitter digital camera 10' through the connectors 1501 and 1501'.

When a user inserts the connection cable 3 into the connector 1501 of the receiver digital camera 10 and the connector 1501' of the transmitter digital camera 10', the control section 18 of the receiver digital camera 10 receives an electrical signal, which is generated by insertion of the connection cable 3 into the connector 1501', from the transmitter digital camera 10' through the data transmission section 17. The control section 18 of the receiver digital camera 10 determines based on the received electrical signal whether or not the transmitter digital camera 10' is an authenticatable device.

Similarly, the control section 18' of the transmitter digital camera 10' receives an electrical signal, which is generated by insertion of the connection cable 3 into the connector 1501, from the receiver digital camera 10 through the data transmission section 17'. The control section 18' of the transmitter digital camera 10' determines based on the received electrical signal whether or not the receiver digital camera 10 is an authenticatable device. In the case where the control sections 18 and 18' determine that the digital cameras 10' and 10 are authenticatable, respectively, a communication between the receiver digital camera 10 and the transmitter digital camera 10' is established.

Next, an authentication method of such digital cameras is described by explaining a process performed in the control section 18 of the receiver digital camera 10.

In the case where the connection cable 3 is a cable designed for use with digital cameras, the control section 18 of the receiver digital camera 10 receives from the transmitter digital camera 10' an electrical signal which indicates that the connection cable 3 is a cable for digital cameras. In such a case where a cable for digital cameras is used, a communication between the receiver digital camera 10 and the transmitter digital camera 10' is established without a determination by the control section 18 about whether or not the transmitter digital camera 10' is an authenticatable device. Thus, in the case where a cable for digital cameras is used as the connection cable 3, a communication between digital cameras can readily be established without an authentication step.

Alternately, in the case where the connection cable 3 is any other type of cable, e.g., a general-purpose cable, the control section 18 of the receiver digital camera 10 receives from the transmitter digital camera 10' an electrical signal which includes information unique to the transmitter digital camera 10'. For example, the information unique to the transmitter digital camera 10' includes an identification number unique to the transmitter digital camera 10'. The receiver digital camera 10 stores an identification number unique to itself and identification numbers of authenticatable devices, which are given to the digital camera 10 at the time of production thereof. These identification numbers may be stored in the control section 18, or may be stored in the incorporated memory 16. The control section 18 compares an identification number included in the received electrical signal with the identification numbers of the authenticatable devices, which are stored in the control section 18 or incorporated memory 16. If the identification number included in the received electrical signal matches any of the identification numbers of the authenticatable devices, the control section 18 determines that the transmitter digital camera 10' is an authenticatable device. As a result, a communication is established between the receiver digital camera 10 and the transmitter digital camera 10'.

The above described authorization process is also performed in the transmitter digital camera 10' in a similar manner.

Using the connection cable 3 for connecting the receiver digital camera 10 and the transmitter digital camera 10' is advantageous because a high data transfer rate can be realized, and a general purpose interface (e.g., USB, IEEE1394, etc.) can be used.

Figure 16:
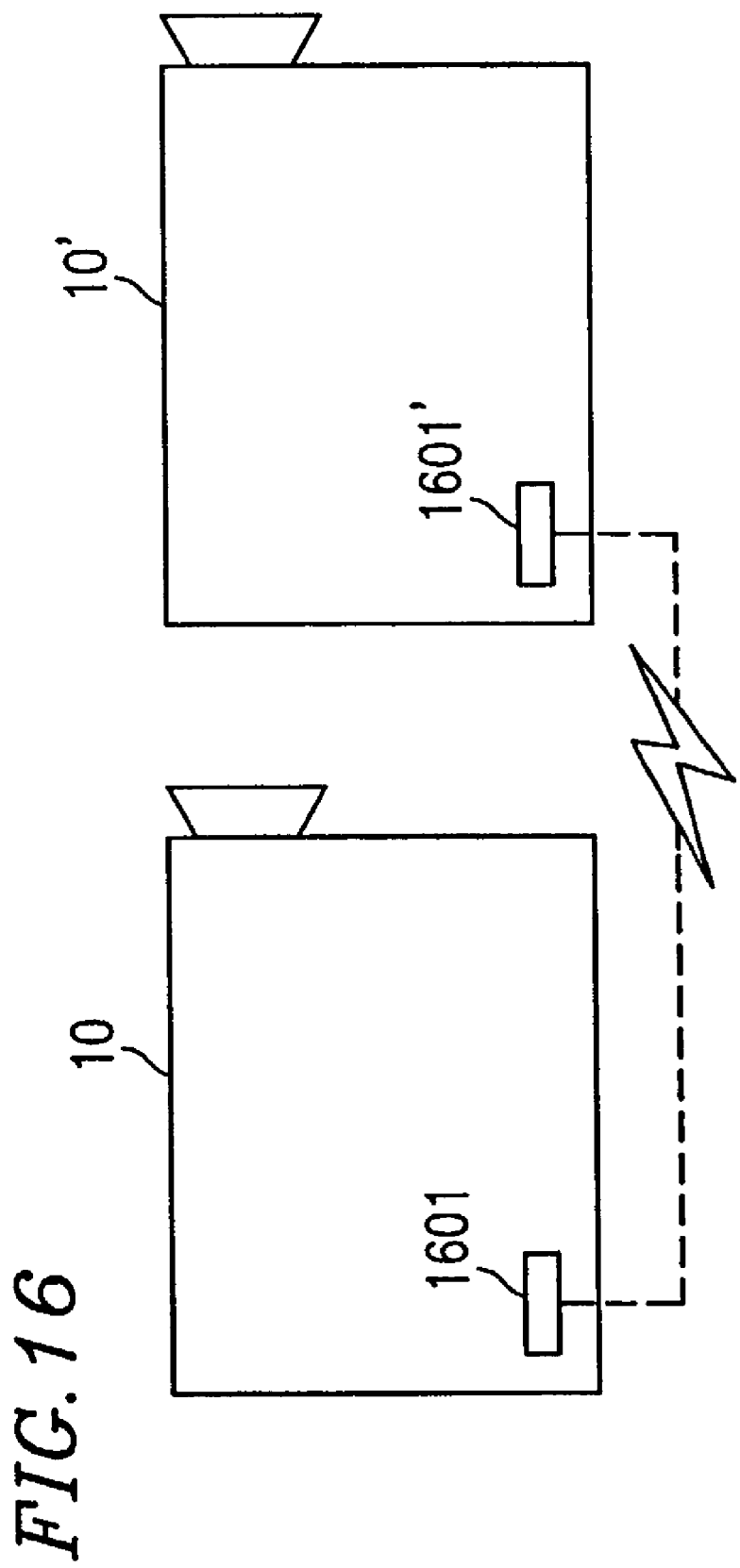
FIG. 16 schematically illustrates a wireless connection between digital cameras.

FIG. 16 schematically illustrates a wireless connection between digital cameras.

According to the present invention, a connection between the receiver digital camera 10 and the transmitter digital camera 10' may be a wireless communication. The data transmission section 17 of the receiver digital camera 10 has an infrared communication interface 1601. Similarly, the data transmission section 17' of the transmitter digital camera 10' also has an infrared communication interface 1601'. For example, when a user turns on switches (not shown) provided in the main bodies of the digital cameras 10 and 10' for initiating an infrared communication, communication signals are emitted from the infrared communication interfaces 1601 and 1601'. The receiver digital camera 10 receives the communication signal emitted from the infrared communication interface 1601', and the transmitter digital camera 10' receives the communication signal emitted from the infrared communication interface 1601. The control section 18 determines based on the received communication signal whether or not the transmitter digital camera 10' is an authenticatable device. Similarly, the control section 18' determines based on the received communication signal whether or not the receiver digital camera 10 is an authenticatable device. In the case where the control sections 18 and 18' determine that the digital cameras 10' and 10 are authenticatable, respectively, an infrared communication 1602 is established between the receiver digital camera 10 and the transmitter digital camera 10'.

Next, an authentication method of such devices is described by explaining a process performed in the control section 18 of the receiver digital camera 10.

The communication signal emitted from the infrared communication interface 1601' includes information unique to the transmitter digital camera 10', which is the same type of information as that described in the above example illustrated in FIG. 15 where a general-purpose cable is employed for connection between the digital cameras 10 and 10'. In this example, the communication signal includes an identification number unique to the transmitter digital camera 10'. The receiver digital camera 10 stores an identification number unique to itself and identification numbers of authenticatable devices, which are given to the digital camera 10 at the time of production thereof. These identification numbers may be stored in the control section 18, or may be stored in the incorporated memory 16. The control section 18 compares an identification number included in the received communication signal with the identification numbers of the authenticatable devices, which are stored in the control section 18 or incorporated memory 16. If the identification number included in the received communication signal matches any of the identification numbers of the authenticatable devices, the control section 18 determines that the transmitter digital camera 10' is an authenticatable device. As a result, an infrared communication is established between the receiver digital camera 10 and the transmitter digital camera 10'.

The above described authorization process is also performed in the transmitter digital camera 10' in a similar manner.

In the case where a user wants to establish a communication only with a digital camera having a specific identification number, the user inputs an identification number of an intended digital camera to his/her digital camera, whereby the user can set his/her digital camera such that it establishes a communication only with the intended digital camera having the identification number input by the user. With such a setting function, the user can establish a communication only between his/her digital camera and an intended digital camera even when a plurality of digital cameras are present in the vicinity of his/her digital camera.

In this embodiment described above, both the control section 18 of the receiver digital camera 10 and the control section 18' of the transmitter digital camera 10' determine each other's authenticity. However, according to the present invention, a communication may also be established when one of these digital cameras determines that the other one is an authenticatable digital camera.

In the case of employing a wireless communication such as an infrared communication, a communication can be established between the receiver digital camera 10 and the transmitter digital camera 10' without using any part other than the digital cameras themselves (e.g., a connection cable 3 shown in FIG. 15). According to the present invention, any other type of wireless communication system different from an infrared communication system, such as a bluetooth™ wireless communication system, may be employed.

Next, an example where a communication between the receiver digital camera 10 and the transmitter digital camera 10' is established by the method illustrated in FIG. 15, and the digital camera 10 receives only desired image data from among image data recorded in the information recording medium 15' of the digital camera 10', is described. As a matter of course, an operation which will be described below is applicable to a case where a communication is established using the method illustrated in FIG. 16

(2) Transmission/Reception of Thumbnail Image Data

Figure 17:
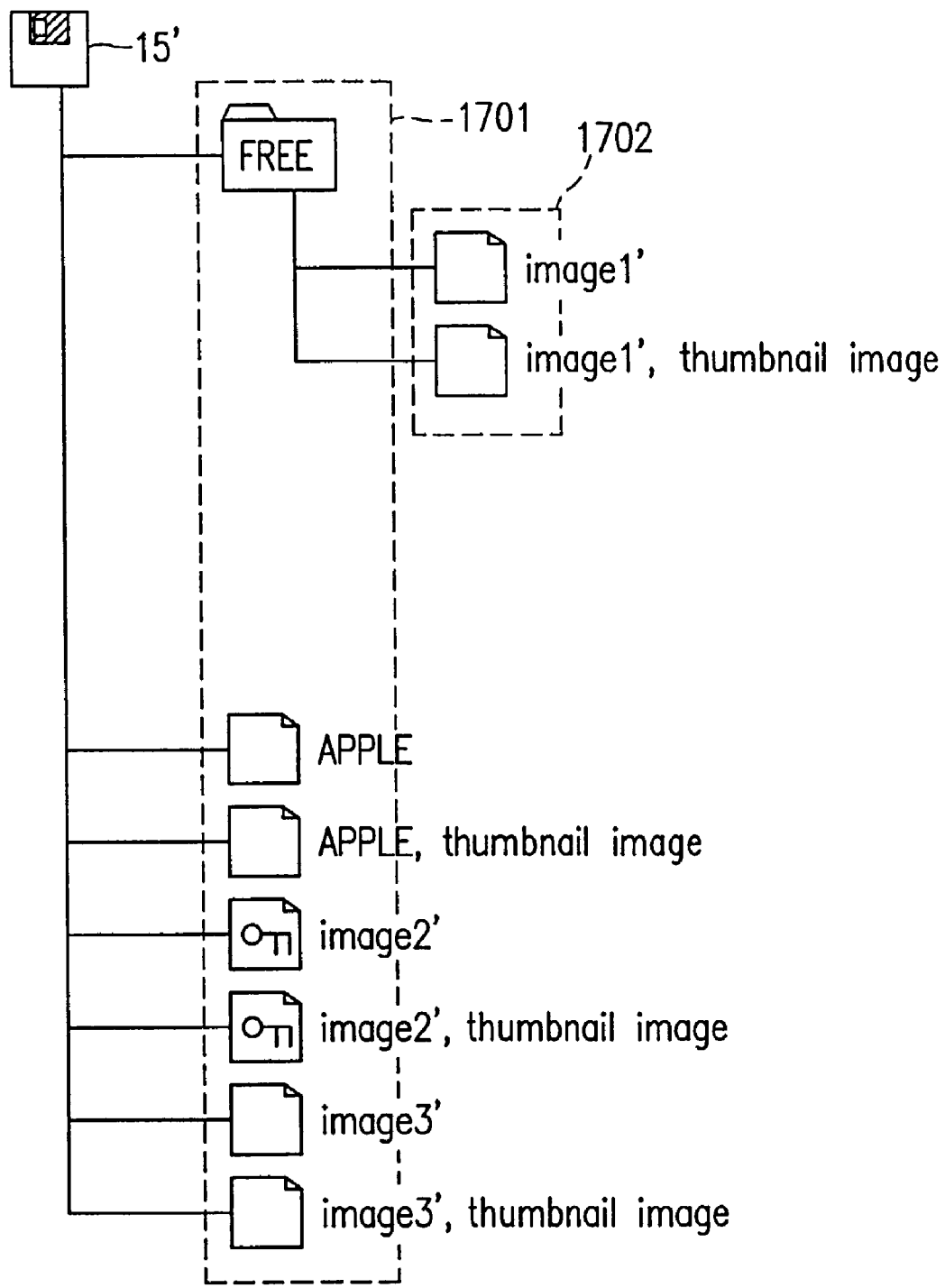
FIG. 17 shows a hierarchical directory structure of image data recorded in an information recording medium 15' of the transmitter digital camera 10'.

FIG. 17 shows a hierarchical directory structure of image data recorded in the information recording medium 15' of the transmitter digital camera 10'. The highest layer 1701 of the information recording medium 15' of the transmitter digital camera 10' includes a FREE folder, an "APPLE" image, an "APPLE" thumbnail image associated with the "APPLE" image, an "image2 '" image, an "image2'" thumbnail image associated with the "image2'" image, an "image3'" image, and an "image3'" thumbnail image associated with the "image3'" image. A subordinate layer 1702 includes an "image1'" thumbnail image associated with the "image1'" image.

Figure 18:
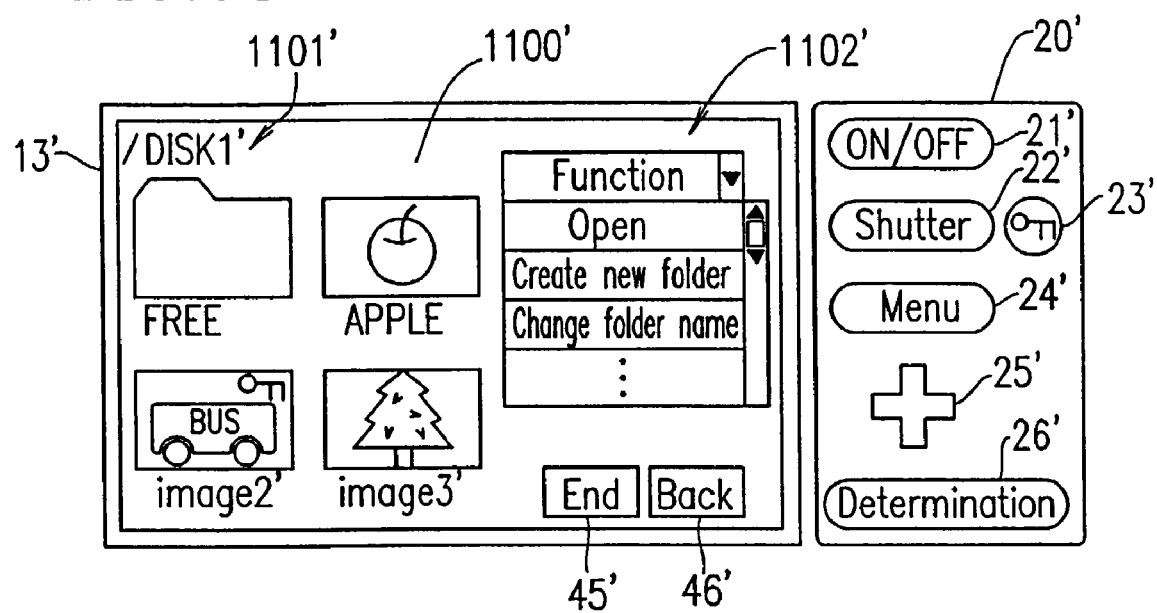
FIG. 18 shows a display 1100' of a display section 13' and a control panel 20' of the transmitter digital camera 10'.

FIG. 18 shows a display 1100' of the display section 13' and a control panel 20' of the transmitter digital camera 10'. FIG. 18 shows thumbnail images included in the highest layer, which are recorded in the information recording medium 15' of the transmitter digital camera 10', in the same fashion as described in connection with the display 1100 of FIG. 11. In FIG. 18, elements having the same functions are indicated by like reference numerals used in FIG. 11, and descriptions thereof are omitted.

The display 1100' shows thumbnail images recorded in the highest layer of the information recording medium 15' (i.e., a folder icon image (FREE folder), the "APPLE" thumbnail image, the "image2'" thumbnail image, and the "image3'" thumbnail image). In the "image2'" thumbnail image, a lock key which indicates that the "image2'" image is protected is shown. The address 1101' is "/DISK1'", which indicates that the information recording medium 15' is DISK1' and that the currently displayed thumbnail images are recorded in the highest layer of the information recording medium 15'.

Now, consider that the receiver digital camera 10, which includes image data arranged in the hierarchical directory structure of FIG. 9, and the transmitter digital camera 10', which includes image data arranged in the hierarchical directory structure of FIG. 17, are connected by the connection cable 3 to establish the digital cameras 10 and 10'.

Figure 19:
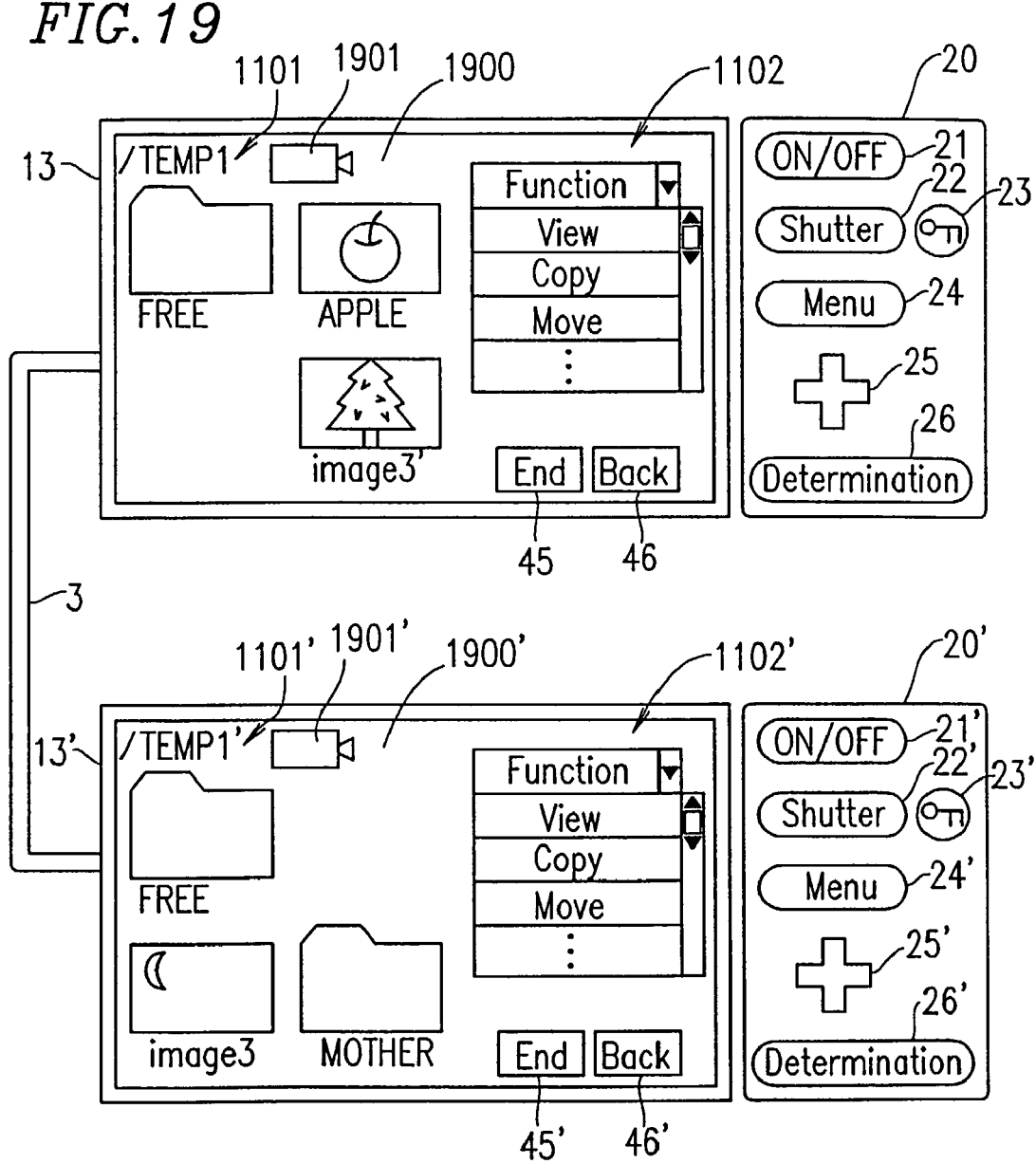
FIG. 19 shows a display 1900 of the receiver digital camera 10 and a display 1900' of the transmitter digital camera 10' immediately after the connection between the receiver digital camera 10 and the transmitter digital camera 10' has been established.

FIG. 19 show a display 1900 of the receiver digital camera 10 and a display 1900' of the transmitter digital camera 10' immediately after the connection between the receiver digital camera 10 and the transmitter digital camera 10' has been established.

After the connection between the receiver digital camera 10 and the transmitter digital camera 10' has been established, the thumbnail image data included in the highest layer of the information recording medium 15' of the transmitter digital camera 10' are sent to the receiver digital camera 10 and recorded in the incorporated memory 16 of the receiver digital camera 10. Similarly, the thumbnail image data included in the highest layer of the information recording medium 15 of the receiver digital camera 10 are sent to the transmitter digital camera 10' and recorded in the incorporated memory 16' of the transmitter digital camera 10'.

In FIG. 19, the thumbnail image data of the highest layer, which are recorded in the incorporated memory 16 and 16', are displayed on the display 1900 of the display section 13 and the display 1900' of the display section 13', respectively.

The display 1900 includes: an address 1101 for indicating which layer the currently displayed thumbnail images belong to; a function button 1102; an end button 45; a back button 46; and an icon 1901 for indicating that the currently displayed thumbnail images are derived from the information recording medium 15' of the transmitter digital camera 10'. In the display 1900, the address 1101 is "/TEMP1'" which indicates the highest layer of the incorporated memory 16. In the display 1900, the thumbnail images are temporarily recorded in the incorporated memory 16 (i.e., a folder icon image (FREE folder), the "APPLE" thumbnail image, and the "image3'" thumbnail image). The "image2'" thumbnail image, which is displayed on the display 1100' of the transmitter digital camera 10' in FIG. 18, is not displayed on the display 1900 of FIG. 19. This is because the "image2'" thumbnail image data has a display prohibition flag, and the receiver digital camera 10 cannot receive such flagged image data and thumbnail image data.

The function button 1102 includes, for example, a "view" button for performing a display of a file, a "copy" button for copying a file or folder; and a "move" button for moving a file or folder. These buttons appear when the function button 1102 is pulled down.

The display 1900' also includes: an address 1101' for indicating which layer the currently displayed thumbnail images belong to; a function button 1102'; an end button 45'; a back button 46'; and an icon 1901' for indicating that the currently displayed thumbnail images are derived from the information recording medium 15 of the receiver digital camera 10. In the display 1900', the address 1101' is "/TEMP1'" which indicates the highest layer of the incorporated memory 16'. The structure of the function button 1102' is the same as that of the function button 1102.

In the display 1900', the thumbnail images are temporarily recorded in the incorporated memory 16' (i.e., folder icon images (the FATHER folder and MOTHER folder) and the "image3" thumbnail image). The "SMILE" thumbnail image, which is displayed on the display 1100 of the receiver digital camera 10 in FIG. 11, is not displayed on the display 1900' of FIG. 19. This is because the "SMILE" thumbnail image data has a display prohibition flag, and the transmitter digital camera 10' cannot receive such flagged image data and thumbnail image data.

Figure 20:
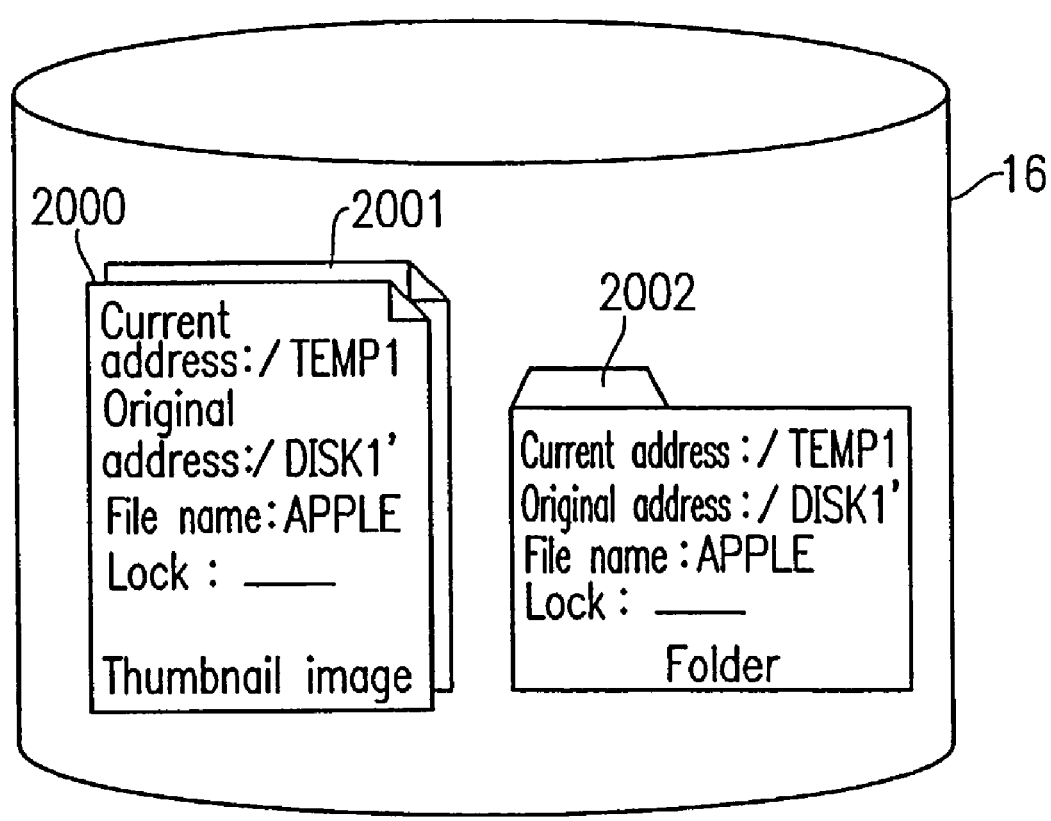
FIG. 20 schematically shows thumbnail image data recorded in an incorporated memory 16.

FIG. 20 schematically shows thumbnail image data recorded in the incorporated memory 16. The thumbnail image data temporarily recorded in the incorporated memory 16 are image data and folder data included in the highest layer 1701 of FIG. 17 to which a display prohibition flag is not attached. Each thumbnail image data includes: a current address where the thumbnail image data is currently stored; an original address from which the thumbnail image data is derived; a file name; a protection status; and information which indicates that the thumbnail image data itself is a thumbnail image. The folder data includes the same information as those included in thumbnail image data except that folder data includes information which indicates that the folder data itself is a folder icon in place of the information which indicates that the thumbnail image data itself is a thumbnail image. Thumbnail image data 2000 is "APPLE" thumbnail image data. Thumbnail image data 2001 is "image3'" thumbnail image data. Folder data 2002 is a folder icon of the FREE folder.

The thumbnail image data and folder data shown in FIG. 20 are different from the thumbnail image data and folder data shown in FIG. 11 in that each of the thumbnail image data and folder data shown in FIG. 20 include the information about the original address in addition to the information about the current address. In the example illustrated in FIG. 20, information about the original address includes "/DISK1'" which indicates the original address of the thumbnail image 2000 in the original information recording medium (information recording medium 15'). The information about the original address may include information inherent to an original information recording medium or original digital camera. Due to the original address information, for example, an association between the "APPLE" thumbnail image recorded in the incorporated memory 16 of the receiver digital camera 10 and the "APPLE" image recorded in the information recording medium 15' of the transmitter digital camera 10' can be maintained. Such an association is merely an example. Such an association can be established in any manner, even when image data and thumbnail image data of the image data exist in different devices, so long as the image data and the thumbnail image data are associated on a one-to-one basis.

The thumbnail image data of the information recording medium 15' of the transmitter digital camera 10' which has been reproduced and recorded in the incorporated memory 16 of the receiver digital camera 10 may be left recorded in the incorporated memory 16 while the thumbnail image data is still associated with a number unique to the information recording medium 15', or alternatively may be deleted automatically.

Now, consider a case where the thumbnail image data is left recorded in the incorporated memory 16 while the thumbnail image data is still associated with a number unique to the information recording medium 15' of the transmitter digital camera 10'.

The thumbnail image data recorded in the information recording medium 15' of the transmitter digital camera 10' is recorded in the incorporated memory 16 of the receiver digital camera 10. Then, the information recording medium 15' is removed from the transmitter digital camera 10', and another information recording medium (not shown) is inserted into the transmitter digital camera 10'. Thereafter, a communication between the receiver digital camera 10 and the transmitter digital camera 10' is established. Again, thumbnail image data recorded in the another information recording medium of the transmitter digital camera 10' is recorded in the incorporated memory 16 of the receiver digital camera 10. In this case, the thumbnail image data which is derived from the information recording medium 15' and which has previously been recorded in the incorporated memory 16 is maintained to be associated with the number unique to the information recording medium 15', and therefore is prevented from being overwritten by the thumbnail image data derived from the another information recording medium.

Then, the another information recording medium is removed from the transmitter digital camera 10', and the information recording medium 15' is inserted into the transmitter digital camera 10', so that a communication between the receiver digital camera 10 and the transmitter digital camera 10' is established. At this point in time, the incorporated memory 16 stores the thumbnail image data associated with the number unique to the information recording medium 15' and the thumbnail image data associated with a number unique to the removed another information recording medium. Therefore, it is not necessary to record in the incorporated memory 16 the thumbnail image data recorded in the information recording medium 15'. Thus, the receiver digital camera 10 can quickly refer to the thumbnail image data derived from the information recording medium 15'. That is, the receiver digital camera 10 can quickly display the thumbnail image data derived from the information recording medium 15' on the display section 13. In this case, the thumbnail image data recorded in the incorporated memory 16 of the receiver digital camera 10 includes a number unique to an information recording medium from which it is derived. For example, the above described original address information may includes a number unique to an original information recording medium and an original storage address in the original information recording medium.

Next, consider a case where the thumbnail image data recorded in the incorporated memory 16 is automatically deleted.

The thumbnail image data recorded in the information recording medium 15' of the transmitter digital camera 10' is recorded in the incorporated memory 16 of the receiver digital camera 10. Then, the information recording medium 15' is removed from the transmitter digital camera 10', and another information recording medium (not shown) is inserted into the transmitter digital camera 10'. Thereafter, a communication between the receiver digital camera 10 and the transmitter digital camera 10' is established. At this point in time, the thumbnail image data which is derived from the information recording medium 15' and which has been recorded in the incorporated memory 16 is deleted. Then, thumbnail image data recorded in the another information recording medium of the transmitter digital camera 10' is recorded in the incorporated memory 16 of the receiver digital camera 10.

Then, the another information recording medium is removed from the transmitter digital camera 10', and the information recording medium 15' is inserted into the transmitter digital camera 10', so that a communication between the receiver digital camera 10 and the transmitter digital camera 10' is established. At this point in time, the thumbnail image data which is derived from the removed another recording medium and which has been recorded in the incorporated memory 16 is deleted.

Thus, it is necessary to record the thumbnail image data recorded in the information recording medium 15' (or another information recording medium) of the transmitter digital camera 10' into the incorporated memory 16 of the receiver digital camera 10 every time a communication between the receiver digital camera 10 and the transmitter digital camera 10' is established. In this case, the capacity of the incorporated memory 16 can be saved, but the thumbnail image data cannot be quickly displayed on the display section 13.

In the above described example, the incorporated memories 16 and 16' are used as primary memories used for temporarily storing data such as thumbnail image data. However, received thumbnail image data may be recorded in the information recording medium 15 and the information recording medium 15'. Thumbnail image recorded in the transmitter digital camera 10' is not reproduced in the transmitter digital camera 10', but is temporarily recorded in the memory section 19 of the receiver digital camera 10 and reproduced in the receiver digital camera 10. With such an arrangement, the thumbnail image obtained from the transmitter digital camera 10' can be quickly displayed on the display section 13.

(3) Reception and Edit of Image Data a User Desires

Figure 21:
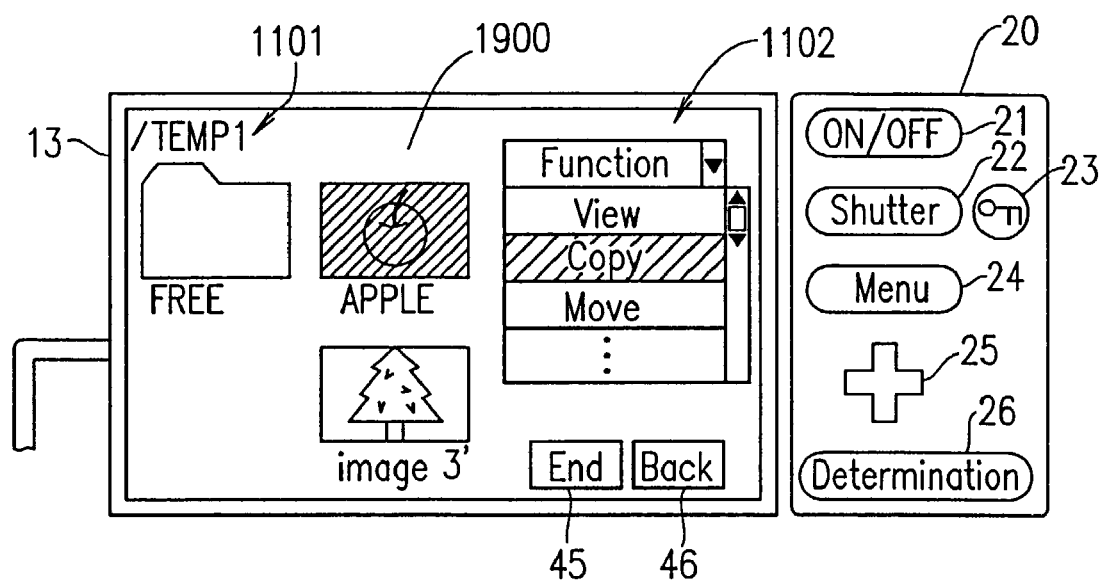
FIG. 21 shows the display 1900 and the control panel 20 of the receiver digital camera 10, which was shown in the upper part of FIG. 19.

FIG. 21 shows the display 1900 and the control panel 20 of the receiver digital camera 10 which was shown in the upper part of FIG. 19.

FIG. 21 shows an example where a user places a highlighted display region on the "APPLE" thumbnail image and selects the "copy" button of the function button 1102. When the user selects the "copy" button, the "APPLE" image data recorded in the information recording medium 15' of the transmitter digital camera 10', which is associated with the selected "APPLE" thumbnail image, is sent from the transmitter digital camera 10' to the receiver digital camera 10 and copied in the information recording medium 15. On the other hand, the "APPLE" thumbnail image data temporarily recorded in the incorporated memory 16 is moved to the information recording medium 15. The "APPLE" image data is displayed on the display section 13 while it is copied in the information recording medium 15.

When the image data ("APPLE" image) is displayed on the display section 13, the definition and size of the image data may be decreased. However, as a matter of course, the decreases in definition and size of the image data should be limited to a level that does not cause problems in the display of the image data on the display section 13. Furthermore, in the case where the image data is a moving image, the image data may be sequentially displayed on the display section 13 while copying the image data from the transmitter digital camera 10' to the information recording medium 15 of the receiver digital camera 10.

In the example illustrated in FIG. 21, the image data recorded in the information recording medium 15' of the transmitter digital camera 10' is directly copied into the information recording medium 15 of the receiver digital camera 10. However, the image data may be once copied into the incorporated memory 16 and then moved to the information recording medium 15. In the case where the incorporated memory 16 is a memory in which data can be written at a high speed, such as a DRAM (dynamic random access memory), the image data to be copied is temporarily stored in the incorporated memory 16 and moved from the incorporated memory 16 to the information recording medium 15. This is because the time required for copying data is shorter as compared with a case where the data is directly copied from the transmitter digital camera 10' to an information recording medium 15 of the receiver digital camera 10.

Figure 22:
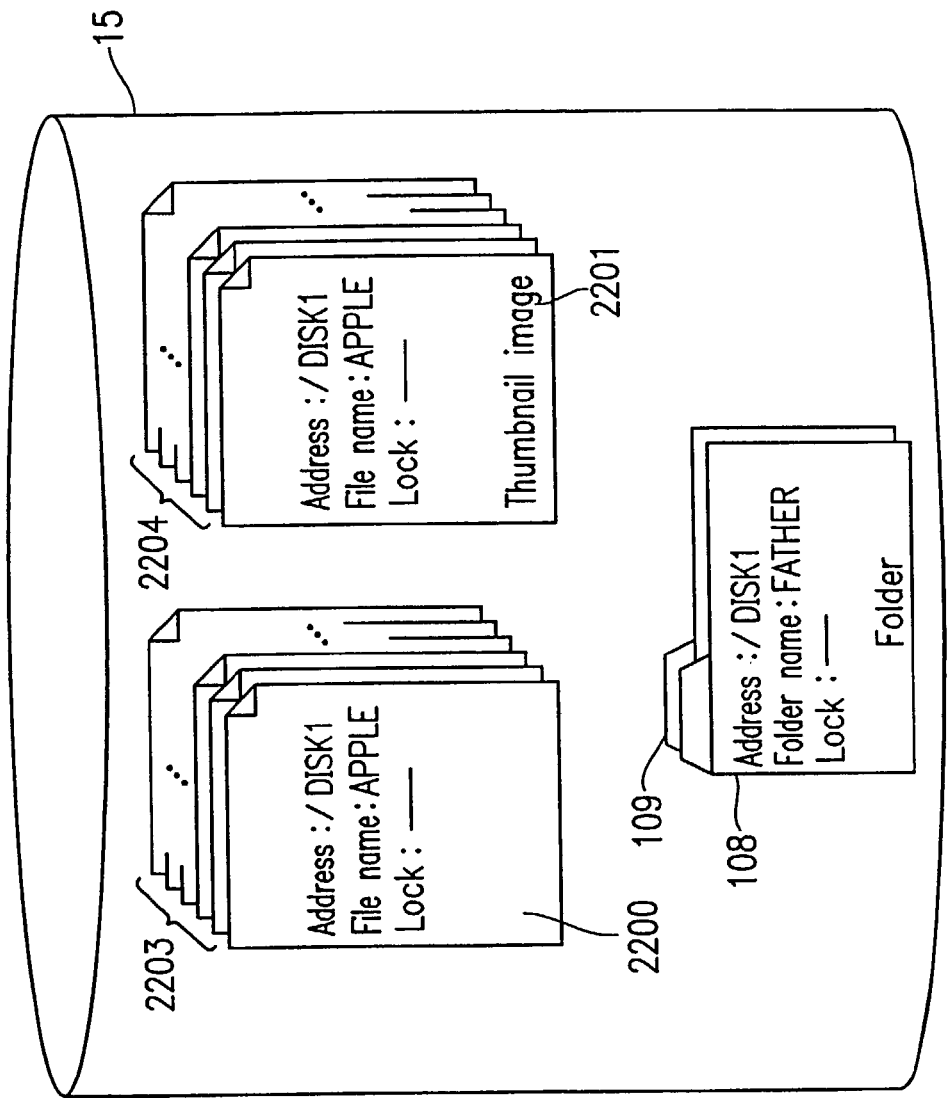
FIG. 22 schematically shows image data, thumbnail image data, and folder data recorded in the information recording medium 15.

FIG. 22 schematically shows image data, thumbnail image data, and folder data recorded in the information recording medium 15. Specifically, FIG. 22 schematically shows image data, thumbnail image data, and folder data recorded in the information recording medium 15 after the "APPLE" image data has been copied from the transmitter digital camera 10' to the information recording medium 15 of the receiver digital camera 10, and the "APPLE" thumbnail image data is moved from the incorporated memory 16 to the information recording medium 15.

Image data 2200 is a copy of the "APPLE" image data recorded in the transmitter digital camera 10'. The image data 2200 is the same as the image data stored in the transmitter digital camera 10' except that the address included in the image data 2200 indicates the address where the image data 2200 is currently stored.

Thumbnail image data 2201 is thumbnail image data moved from the incorporated memory 16 to the information recording medium 15. The thumbnail image data 2201 is the same as the thumbnail image data 2000 of FIG. 20 except that the original address (e.g., "/DISK1'" of FIG. 20) is deleted. A set of image data 2203 corresponds to the sets of image data 102, 103, and 104 of FIG. 10. A set of image data 2204 corresponds to the sets of image data 105, 106, and 107 of FIG. 10.

As described above in connection with FIG. 21, when a user selects a button other than the "copy" button, e.g., when a user selects the "move" button, the image data associated with the selected thumbnail image is copied to the receiver digital camera 10 and then deleted from the transmitter digital camera 10'.

Alternatively, when a user selects the "view" button in FIG. 21, the image data in the transmitter digital camera 10' which is associated with the selected thumbnail image is sent to the incorporated memory 16 of the receiver digital camera 10 from the transmitter digital camera 10' and temporarily stored in the incorporated memory 16 of the receiver digital camera 10. Thereafter, if the user wants to "copy" or "move" the image data temporarily stored in the incorporated memory 16, the image data and the thumbnail image data, which are stored in the incorporated memory 16, are moved to the information recording medium 15. In this case, since the image data is simply moved from the incorporated memory 16 to the information recording medium 15, the processing time is short. However, if the user selects the "move" button, thumbnail image data and image data associated with the thumbnail image data, which are to be moved from the incorporated memory 16 to the information recording medium 15, are deleted from the information recording medium 15' of the transmitter digital camera 10'.

Alternatively, in FIG. 21, when a user selects the FREE folder and selects the "copy" or "move" button, all of the image data and thumbnail image data included in the FREE folder recorded in the information recording medium 15' of the transmitter digital camera 10' are copied or moved into the information recording medium 15 of the receiver digital camera 10. However, if the user selects the "move" button, the selected folder (and the thumbnail image data and image data associated with the thumbnail image data which are included in the selected folder) are deleted from the information recording medium 15' of the transmitter digital camera 10'.

In the above examples illustrated in FIGS. 21 and 22, the user selects one thumbnail image. However, the use can select any number of thumbnail images. In the case where the use selects a plurality of thumbnail images, the selected thumbnail images can be sequentially processed (e.g., copied or moved).

In the case where the image data recorded in the information recording medium 15' of the transmitter digital camera 10' is changed (e.g., added or deleted), the control section 18 of the receiver digital camera 10 instructs the data transmission section 17 to compare thumbnail image data associated with the changed image data which is recorded in the information recording medium 15', with thumbnail image data which are temporarily stored in the incorporated memory 16 of the receiver digital camera 10. The control section 18 receives from the data transmission section 17 only information corresponding to a difference between the compared thumbnail image data (for example, information indicating that certain thumbnail image data is deleted or added) and performs an overwriting operation in the incorporated memory 16 based on the received information. With such an arrangement, old thumbnail image data is updated, and the updated thumbnail image data is displayed on the display section 13. Thus, since the control section 18 receives only such difference information, the speed of processing for transmitting image data from the transmitter digital camera 10' to the receiver digital camera 10 is increased.

For example, the difference information can be produced as explained below. The control section 18 of the receiver digital camera 10 instructs the data transmission section 17 to issue an instruction to produce difference information and send the produced difference information to the receiver digital camera 10. In response to such an instruction, the transmitter digital camera 10' produces difference information and sends only the produced difference information to the receiver digital camera 10.

Thus, after a user selects at least one desired thumbnail image, a desired processing can be performed only on the selected thumbnail image. Therefore, it is not necessary to receive an excessive amount of image data, and the capacity of the information recording medium 15 can be saved. Further, only a necessary processing is performed, and accordingly, the entire processing rate is high.

Figure 23:
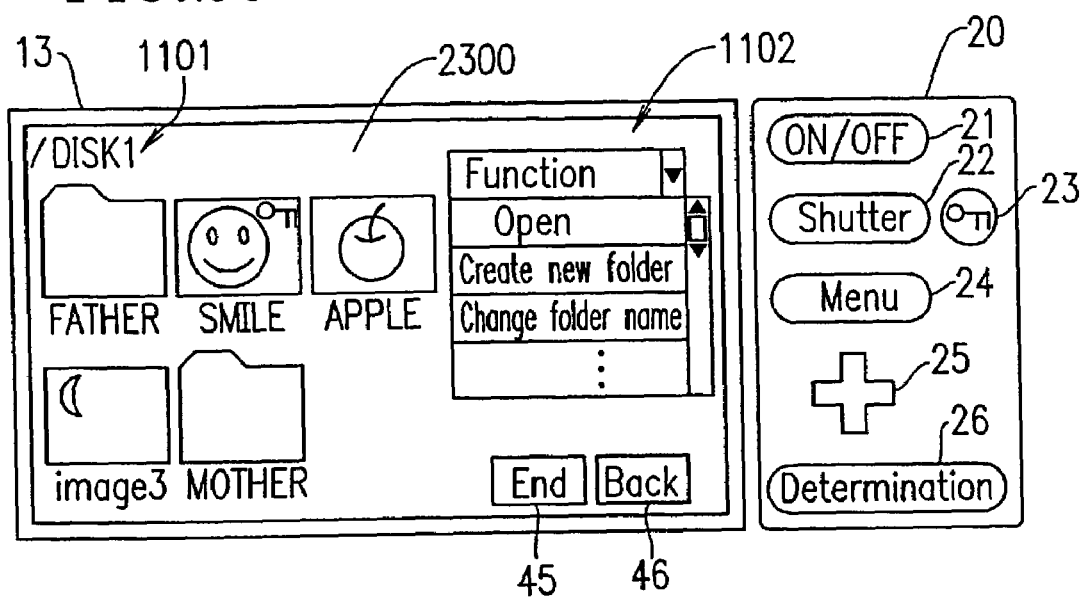
FIG. 23 shows a display 2300 and the control panel 20 of the display section 13 of the receiver digital camera 10 after the receiver digital camera 10 receives image data from the transmitter digital camera 10' and records the received image data in the information recording medium 15.

FIG. 23 shows a display 2300 of the display section 13 and the control panel 20 of the receiver digital camera 10 after the receiver digital camera 10 receives image data from the transmitter digital camera 10' and records the received image data in the information recording medium 15.

When the edit button 32 of FIG. 3 is selected after the receiver digital camera 10 receives "APPLE" image data from the transmitter digital camera 10' and records the received "APPLE" image data in the information recording medium 15, and a user depresses the menu button 24 in FIG. 21, a display 2300 is displayed as shown in FIG. 23.

The display 2300 includes: an address 1101 indicating which layer the currently displayed thumbnail images belong to; a function button 1102; an end button 45, and a back button 46. In the display 2300, the address 1101 is "/DISK1", which indicates the highest layer of the information recording medium 15 is shown. The display 2300 shows a thumbnail image recorded in the information recording medium 15, i.e., the folder icon images (FATHER folder and MOTHER folder) and the "APPLE" thumbnail image and "image3'" thumbnail image. The display 2300 is the same as the display 1100 of FIG. 11 except that the "APPLE" image is added.

The "APPLE" image, which is received from the transmitter digital camera 10' and recorded in the information recording medium 15 of the receiver digital camera 10, can also be subjected to various processing as described in connection with FIGS. 11 through 13.

(4) Processing of the Control Section 18

Figure 24:
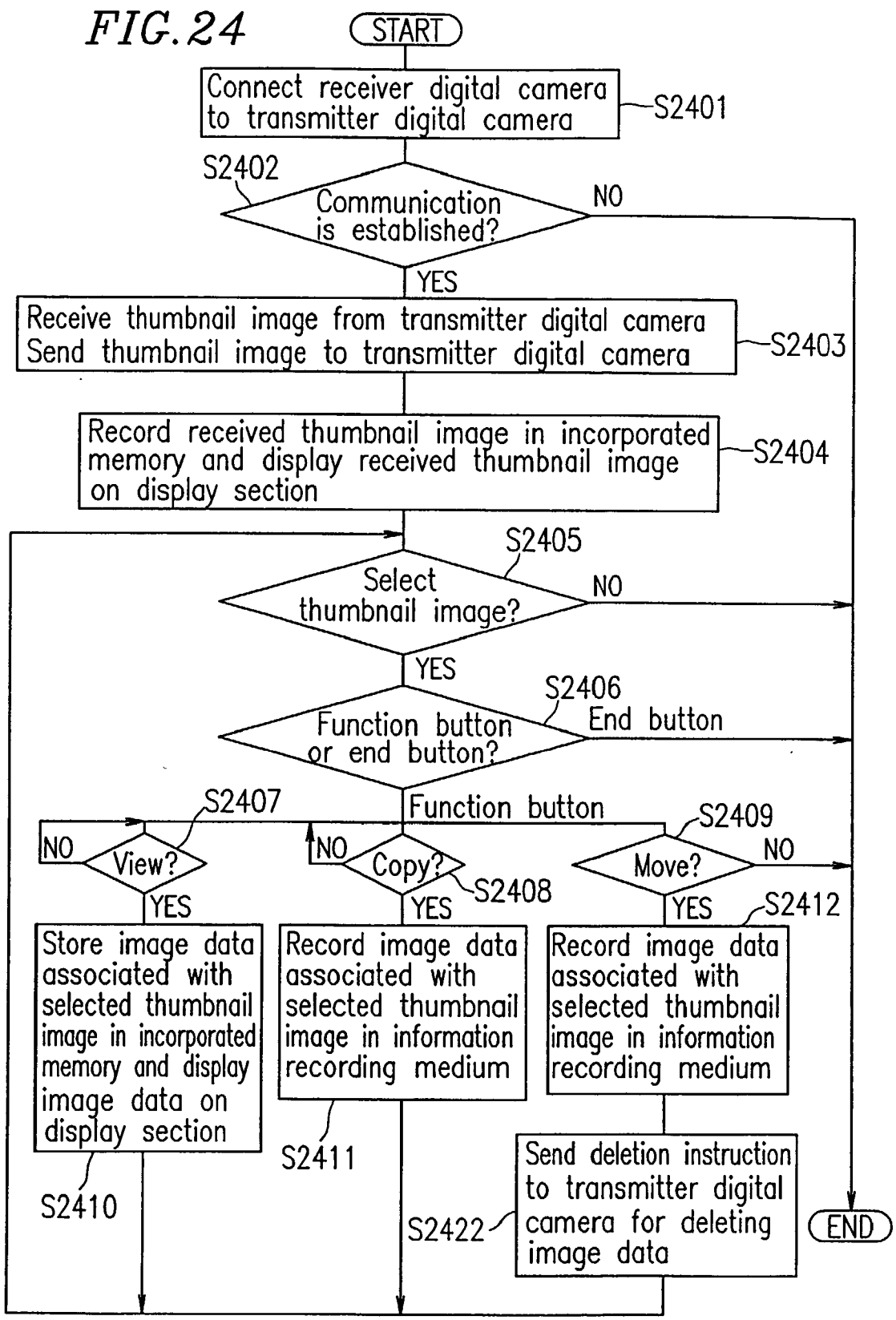
FIG. 24 is a flowchart which illustrates a process performed by the control section 18 for establishing a communication between the digital camera 10 and the transmitter digital camera 10' and receiving image data desired by a user from the transmitter digital camera 10'.
Figure 25:
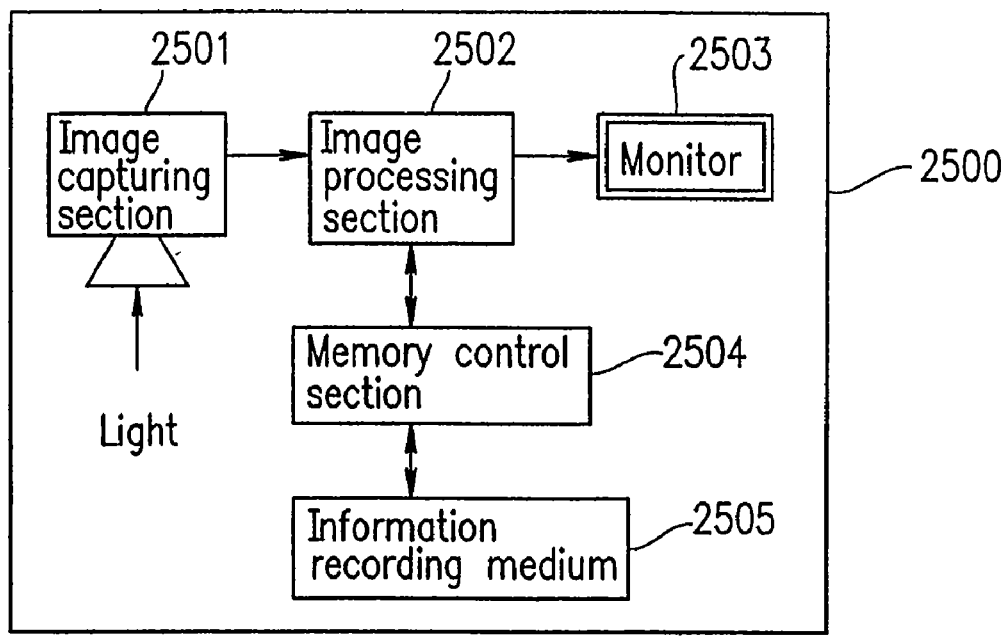
FIG. 25 shows a structure of a conventional digital camera 2500.

FIG. 24 is a flowchart which illustrates a process performed by the control section 18 for establishing a communication between the receiver digital camera 10 and the transmitter digital camera 10' and receiving image data desired by a user from the transmitter digital camera 10'. Steps of this process performed by the control section 18 are described below.

Step S2401: The connection cable 3 (FIG. 1) is connected to the receiver digital camera 10 and the transmitter digital camera 10' through the connector 1501, which is provided at the data transmission section 17 of the receiver digital camera 10, and the connector 1501', which is provided at the data transmission section 17' of the transmitter digital camera 10', respectively.

In the case where the communication between the digital camera 10 and the transmitter digital camera 10' is established by a wireless communication system, Step S2401 is omitted.

Step S2402: The control section 18 (FIG. 1) determines whether or not a communication is established between the receiver digital camera 10 and the transmitter digital camera 10'. The control section 18 confirms whether or not a communication is established between the digital cameras 10 and 10' by the method described with reference to FIG. 15 or 16.

Step S2403: After the control section 18 confirms that a communication has been established between the digital cameras 10 and 10', the control section 18 instructs the data transmission section 17 to receive thumbnail image data included in the highest layer recorded in the information recording medium 15' of the transmitter digital camera 10'.

On the other hand, the control section 18 sends thumbnail image data included in the highest layer recorded in the information recording medium 15 of the receiver digital camera 10 to the transmitter digital camera 10'. In this step, the control section 18 determines whether or not any of the thumbnail image data derived from the highest layer of the information recording medium 15' of the transmitter digital camera 10' has a display prohibition flag. Based on a result of the determination, the control section 18 controls the data transmission section 17 so as not to receive thumbnail image data having a display prohibition flag from the transmitter digital camera 10'.

Herein, the control section 18 may instructs the recording/reproducing section 14 to delete thumbnail image data which has been already sent to the transmitter digital camera 10' from the information recording medium 15.

Step S2404: The control section 18 instructs the recording/reproducing section 14 to temporarily record the thumbnail image data received by the data transmission section 17 in the incorporated memory 16 of the memory section 19. On the other hand, the control section 18 instructs the image data generation section 12 to display the thumbnail image data received by the data transmission section 17 on the display section 13.

Step S2405: The control section 18 determines whether or not a user selected at least one of the thumbnail image data displayed on the display section 13. When the control section 18 determines that the user selected any of the thumbnail image data displayed on the display section 13, the process proceeds to Step S2406. Otherwise, the process terminates.

Step S2406: The control section 18 determines whether the user selected the function button 1102 or the end button 45. If the control section 18 determines that the user selected the function button 1102, the process proceeds to Steps S2407 through S2409. Otherwise, the process terminates.

Step S2407: The control section 18 determines whether or not the user selected the "view" button. If the control section 18 determines that the user selected the "view" button, the process proceeds to Step S2410. Otherwise, the process proceeds to Steps S2408 through S2409.

Step S2410: The control section 18 instructs the data transmission section 17 of the receiver digital camera 10 to receive image data associated with selected thumbnail image data from the information recording medium 15' of the transmitter digital camera 10'. Then, the control section 18 instructs the recording/reproducing section 14 to record the image data received by the data transmission section 17 in the incorporated memory 16. Thereafter, the control section 18 instructs the image data generation section 12 to display the image data on the display section 13. Then, the process returns to Step S2405.

Step S2408: The control section 18 determines whether or not the user selected the "copy" button. If the control section 18 determines that the user selected the "copy" button, the process proceeds to Step S2411. Otherwise, the process proceeds to Step S2409.

Step S2411: The control section 18 instructs the data transmission section 17 of the receiver digital camera 10 to receive image data associated with selected thumbnail image data from the information recording medium 15' of the transmitter digital camera 10'. Then, the control section 18 instructs the recording/reproducing section 14 to record the image data received by the data transmission section 17 in the information recording medium 15. Thereafter, the process returns to Step S2405.

Step S2409: The control section 18 determines whether or not the user selected the "move" button. If the control section 18 determines that the user selected the "move" button, the process proceeds to Step S2412. Otherwise, the process terminates.

Step S2412: The control section 18 instructs the data transmission section 17 of the receiver digital camera 10 to receive image data associated with selected thumbnail image data from the information recording medium 15' of the transmitter digital camera 10'. Then, the control section 18 instructs the recording/reproducing section 14 to record the image data received by the data transmission section 17 in the information recording medium 15.

Step S2422: The control section 18 instructs the data transmission section 17 to send a deletion instruction to the transmitter digital camera 10' for deleting that image data from the information recording medium 15'. Thereafter, the process returns to Step S2405.

In this embodiment, transmission of image data from the transmitter digital camera 10' to the receiver digital camera 10 for the purpose of copying, moving, or display, and transmission of image data from the receiver digital camera 10 to the transmitter digital camera 10' for the purpose of copying, moving, or display, can be performed simultaneously. That is, the receiver digital camera 10 can refer to thumbnail image data recorded in the information recording medium 15' of the transmitter digital camera 10' while the transmitter digital camera 10' refers to thumbnail image data recorded in the information recording medium 15 of the receiver digital camera 10. Between two digital cameras, display, copying, or moving of image data is performed from the first camera to the second, and from the second camera to the first, simultaneously. Thus, in such a case, the manipulation time is short as compared with a case where image data is exchanged such that transmission of image data from the first camera to the second camera and transmission of image data from the second camera to the first camera are performed at separate times.

In this specification, the receiver digital camera 10 and the transmitter digital camera 10' have identical functions, and can exchange data therebetween. However, according to the present invention, it is not an indispensable requirement that the receiver digital camera 10 and the transmitter digital camera 10' are of the same product model or have identical functions. It is appreciated that the present invention can be practiced so long as the transmitter digital camera 10' is an external device having a predetermined interface.

According to a digital camera of the present invention, an image data generation section of the digital camera generates image data which represents an image of an object and index data which is associated with the image data. A plurality of indices can be displayed on a display section, and therefore, a user can readily know the contents of image data recorded in a memory section.

According to a digital camera of the present invention, the control section controls the following processes: establishment of a communication between a digital camera and an external device; reception of index data by a data communication section from the external device; recording of the received index data by a recording/reproducing section; and display of at least one index, which is represented by the received index data, on the display section by the image data generation section. With such an arrangement, a user can readily know the contents of image data included in the external device without a personal computer.

According to a digital camera of the present invention, when a user selects a desired index from among indices which have been derived from the external device and displayed on the display section, the control section controls the data communication section to receive image data associated with a selected index from the external device. The received image data is recorded in the memory section. With such an arrangement, the user can receive only image data desired by a user from the external device and edit the received image data.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A digital camera, comprising:
   an image capturing section for capturing an image of an object;
   an image data generation section for generating image data which represents the captured image of the object and index data associated with the image data;
   a display section for displaying the image data and the index data;
   a recording/reproducing section for recording the image data and the index data in a memory section and reproducing the image data and the index data recorded in the memory section;
   a data communication section for sending the image data and the index data, which are recorded in the memory section, to an external device, and receiving image data and index data from the external device; and
   a control section for controlling the image data generation section, the recording/reproducing section, and the data communication section,
   wherein the control section controls establishment of a communication between the digital camera and the external device, and controls the data communication section to receive the index data from the external device,
   the control section controls the recording/reproducing section to record the received index data in the memory section, and controls the image data generation section to display at least one index which is represented by the received index data on the display section, and
   the control section controls the data communication section to receive, from the external device, image data associated with an index selected by a user from among the at least one index displayed on the display section, and controls the recording/reproducing section to record the received image data in the memory section,
   wherein the control section controls the data communication section so as to receive from the external device only information corresponding to a difference between the index data recorded in the memory section and the index data modified in the external device.

2. A digital camera according to claim 1, wherein the index is a thumbnail image.

3. A digital camera according to claim 1, wherein the control section controls the data communication section to send to the external device an instruction for deleting image data associated with the selected index.

4. A digital camera according to claim 1, wherein the data communication section uses a communication cable or a wireless communication system.

5. A digital camera according to claim 1, wherein the display section further includes contact-type input means.

6. A digital camera according to claim 1, wherein the memory section includes a rewritable optical recording medium or a rewritable semiconductor memory.

7. A digital camera according to claim 1, wherein the image data generation section generates image data and index data such that each of the image data and index data has a display prohibition flag which prevents reception of the image data or index data by the external device.

8. A digital camera according to claim 1, wherein: the control section determines whether or not the index data from the external device has a display prohibition flag; and if the index data has the display prohibition flag, the control section controls the data communication section so as not to receive the index data having the display prohibition flag and image data associated with the index data.

9. A digital camera according to claim 1, wherein: the digital camera has a unique identification number; the control section compares the unique identification number of the digital camera with an identification number unique to the external device; and if the control section determines as a result of the comparison that the external device is an authenticatable device, a communication between the digital camera and the external device is established.

10. A digital camera according to claim 1, wherein: the control section controls the recording/reproducing section to record image data and index data generated by the image data generation section in the memory section in units of a folder; the folder has a hierarchical directory structure.

11. A digital camera according to claim 10, wherein: the control section controls the recording/reproducing section to reproduce the image data and the index data recorded in a certain layer of the hierarchical directory structure in the memory section; and the control section controls the image data generation section to display the reproduced image data and index data on the display section.

12. A digital camera, comprising:
an image capturing section for capturing an image of an object;
an image data generation section for generating image data which represents the captured image of the object and index data associated with the image data;
a display section for displaying the image data and the index data;
a recording/reproducing section for recording the image data and the index data in a memory section and reproducing the image data and the index data recorded in the memory section;
a data communication section for sending the image data and the index data, which are recorded in the memory section, to an external device, and receiving image data and index data from the external device; and
a control section for controlling the image data generation section, the recording/reproducing section, and the data communication section,
wherein the control section controls establishment of a communication between the digital camera and the external device, and controls the data communication section to receive the index data from the external device,
the control section controls the recording/reproducing section to record the received index data in the memory section, and controls the image data generation section to display at least one index which is represented by the received index data on the display section, and
the control section controls the data communication section to receive, from the external device, image data associated with an index selected by a user from among the at least one index displayed on the display section, and controls the recording/reproducing section to record the received image data in the memory section,
wherein:
the digital camera has a unique identification number;
the control section compares the unique identification number of the digital camera with an identification number unique to the external device; and
if the control section determines as a result of the comparison that the external device is an authenticatable device, a communication between the digital camera and the external device is established.

13. A digital camera according to claim 12, wherein the index is a thumbnail image.

14. A digital camera according to claim 12, wherein the control section controls the data communication section to send to the external device an instruction for deleting image data associated with the selected index.

15. A digital camera according to claim 12, wherein the data communication section uses a communication cable or a wireless communication system.

16. A digital camera according to claim 12, wherein the display section further includes contact-type input means.

17. A digital camera according to claim 12, wherein the memory section includes a rewritable optical recording medium or a rewritable semiconductor memory.

18. A digital camera according to claim 12, wherein the image data generation section generates image data and index data such that each of the image data and index data has a display prohibition flag which prevents reception of the image data or index data by the external device.

19. A digital camera according to claim 12, wherein:
the control section determines whether or not the index data from the external device has a display prohibition flag; and
if the index data has the display prohibition flag, the control section controls the data communication section so as not to receive the index data having the display prohibition flag and image data associated with the index data.

20. A digital camera according to claim 12, wherein:
the control section controls the recording/reproducing section to record image data and index data generated by the image data generation section in the memory section in units of a folder;
the folder has a hierarchical directory structure.

21. A digital camera according to claim 20, wherein:
the control section controls the recording/reproducing section to reproduce the image data and the index data recorded in a certain layer of the hierarchical directory structure in the memory section; and
the control section controls the image data generation section to display the reproduced image data and index data on the display section.

* * * * *